(12) United States Patent
Nakagiri et al.

(10) Patent No.: US 7,679,776 B2
(45) Date of Patent: Mar. 16, 2010

(54) INFORMATION PROCESSING APPARATUS, INFORMATION PROCESSING METHOD, AND STORAGE MEDIUM STORING COMPUTER-READABLE PROGRAM THEREIN

(75) Inventors: Koji Nakagiri, Kawasaki (JP); Satoshi Nishikawa, Yokohama (JP); Yasuo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 11/905,645

(22) Filed: Oct. 3, 2007

(65) Prior Publication Data

US 2008/0043285 A1 Feb. 21, 2008

Related U.S. Application Data

(62) Division of application No. 09/698,052, filed on Oct. 30, 2000, now Pat. No. 7,301,656.

(30) Foreign Application Priority Data

Nov. 2, 1999 (JP) ................................. 11-312871

(51) Int. Cl.
*G06F 15/00* (2006.01)
*G06F 17/00* (2006.01)

(52) U.S. Cl. ..................................... 358/1.18; 715/255

(58) Field of Classification Search ................ 358/1.18, 358/1.15, 1.16, 1.14, 1.13, 401, 402, 403, 358/1.1, 1.2, 517; 399/23, 24, 27, 82, 408; 382/154, 305; 715/255, 275, 770, 234, 768, 715/249; 709/203, 206, 217
See application file for complete search history.

(56) References Cited

U.S. PATENT DOCUMENTS

| | | | |
|---|---|---|---|
| 5,847,848 A | 12/1998 | Suzuki et al. | 358/518 |
| 5,953,007 A * | 9/1999 | Center et al. | 715/764 |
| 5,963,216 A | 10/1999 | Chiarabini et al. | 345/660 |
| 6,100,998 A | 8/2000 | Nagao et al. | 358/1.9 |
| 6,173,295 B1 | 1/2001 | Goertz et al. | 715/505 |
| 6,493,099 B2 | 12/2002 | Nakagiri | 358/1.13 |
| 6,570,669 B1 | 5/2003 | Onuma | 358/1.15 |
| 6,621,590 B1 | 9/2003 | Livingston | 358/1.15 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

When a preview of a composed job is performed by composing data outputted from an application for printing, in order to provide a method for enabling the preview to be performed in consideration of a layout of each print job, one composed job is formed by composing the print jobs obtained by converting the data to be printed into the data in an intermediate code format and this method is realized by controlling so as to display the preview of the composed job on the basis of layout information of each print job in the composed job.

9 Claims, 19 Drawing Sheets

FIG. 10

| | |
|---|---|
| JOB ID | 1001 |
| JOB SETTING INFO | 1002 |
| NO. OF PHYSICAL PAGES OF JOB | 1003 |
| 1ST PHYSICAL PAGE INFO | 1004 |
| 2ND PHYSICAL PAGE INFO | 1005 |
| ... | 1006 |
| LAST PHYSICAL PAGE INFO | 1007 |

FIG. 11

| | |
|---|---|
| NO. OF ENTIRE PHYSICAL PAGES | 1101 |
| NO. OF ENTIRE LOGICAL PAGES | 1102 |
| NO. OF COPIES | 1103 |
| COPY-BY-COPY PRINT | 1104 |
| FINISHING | 1105 |
| ADDITIONAL INFO | 1106 |

FIG. 12

| | |
|---|---|
| PHYSICAL PAGE NO. | 1201 |
| PHYSICAL PAGE SETTING INFO | 1202 |
| N: NO. OF LOGICAL PAGES IN PHYSICAL PAGE | 1203 |
| 1ST LOGICAL PAGE INFO | 1204 |
| 2ND LOGICAL PAGE INFO | 1205 |
| ... | 1206 |
| NTH LOGICAL PAGE INFO | 1207 |

FIG. 13

| | |
|---|---|
| ARRANGEMENT OF LOGICAL PAGES IN PHYSICAL PAGE | 1301 |
| OBVERSE/REVERSE SIDE OF DUPLEX PRINT | 1302 |
| COLOR/MONOCHROME PRINT | 1303 |
| ADDITIONAL INFO | 1304 |

FIG. 14

| | |
|---|---|
| LOGICAL PAGE ID | 1401 |
| LOGICAL PAGE NO. | 1402 |
| FORMAT INFO | 1403 |

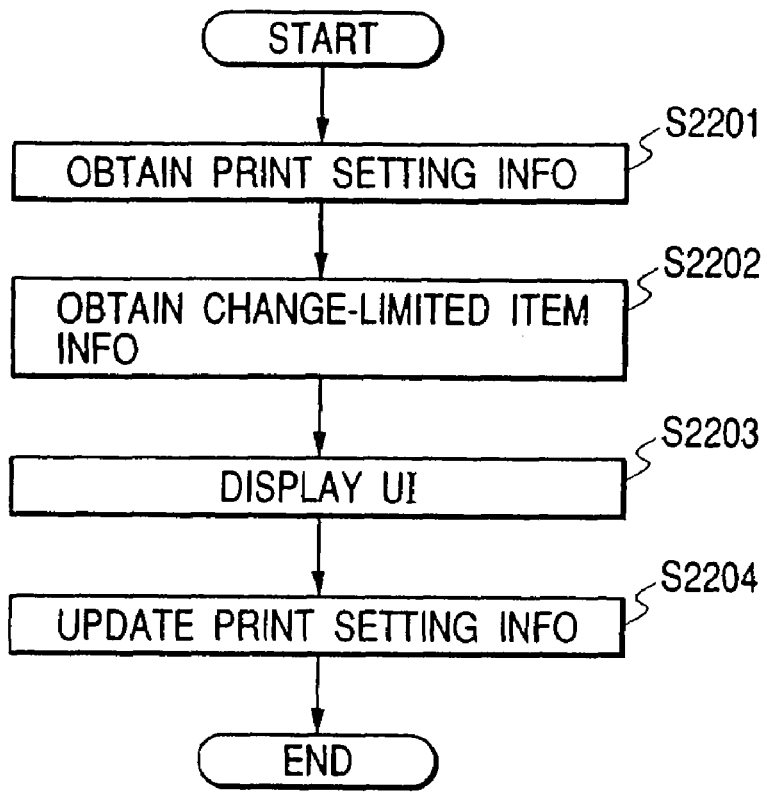

```
API GETLAYOUT INFO (IMODE, PDEVMODE, PINFO)
    IMODE:     DESIGNATE PROCESSING MODE
               1 : LAYOUT IN HOST
               2 : LAYOUT IN PRINTER
    PDEVMODE : POINTER TO PRINT SETTING INFO
    PINFO :    POINTER TO LAYOUT INFO
```

INFORMATION PROCESSING APPARATUS, INFORMATION PROCESSING METHOD, AND STORAGE MEDIUM STORING COMPUTER-READABLE PROGRAM THEREIN

This application is a division of application Ser. No. 09/698,052, filed Oct. 30, 2000, the contents of which are incorporated herein by reference.

BACKGROUND OF THE INVENTION

1. Field of the Invention

The invention relates to print setting method and apparatus for a print job and a medium. More particularly, the invention relates to an information processing apparatus and an information processing method, in which a control is made so as to display a preview in consideration of a print setting of text data which is formed by an application, and also relates to a storage medium in which a program for realizing such a method has been stored and a computer-readable program.

2. Related Background Art

In a client computer, when a document (text data) formed by a certain application is printed, various layouts can be designated and printed by using a printer driver having an advanced function in recent years. As the setting of the layout becomes complicated, a method whereby an output result is previously confirmed (previewed) on a screen of a host is an effective method in order to promptly and usefully obtain a desired print result.

Generally, each application uniquely provides a function for previewing on a screen of the client computer (host computer) prior to printing. In this case, a preview of a result obtained by adapting a layout function which the application has can be confirmed on the screen.

The conventional method, however, has a problem such that the layout functions which are provided by a printing apparatus such as a printer or the like and by a printer driver for such a printer cannot be confirmed on the application.

There is also software having a "collective print" function such that text data whose printing has been instructed by an application is held in a client without outputting to a printer and a plurality of text data is transmitted as one job to the printer.

There is a case where the user wants to collectively print jobs formed by a plurality of applications, for example, an application A suitable to form a document, an application B suitable to form a table, an application C suitable to form a drawing, and the like. However, the "collective print" function is nothing but a function such that a plurality of print jobs are collectively set to one print job. Since an instruction to perform a collective print is issued and data is also outputted upon printing in order at which the data has been spooled for collective printing, there is a problem such that the user has to spool it to an outputted page and a use efficiency is low. For example, in the case where the user wants to print materials constructed one page by one such as document, drawing, document, table, and document, the user has to perform the following operations. That is, the first page is formed by the application A and spooled. The second page is formed by the application B and spooled. The third page is again formed by the application A and spooled. The fourth page is formed by the application C and spooled. The fifth page is formed by the application A and spooled.

Even in the case where the user wants to see a preview of one collected data to be printed, although he can see the preview provided by each application, he cannot see a preview which reflects a plurality of print settings which are set by the printer driver.

Further, in the case where the user wants to collect a plurality of files and print them as one job, even if the user wants to designate finishing to the collected job, there is no means for providing it and there is a problem such that an apparatus having a preview function in such a case does not exist. There is, consequently, a problem such that a state where they are actually printed and outputted by the printing apparatus cannot be recognized unless they are printed.

To solve the above problems, a method whereby a function such that print setting attributes of a print job which has once been spooled are further edited is provided is considered. By using such a function, not only the collective print of a plurality of print jobs can be performed but also a construction such that they are composed as one job and the print setting is edited as a composed job is possible.

However, there is also a problem such that a result obtained in the case where a plurality of jobs in which different layout settings have been designated are collectively printed in a state of the different layouts or the layouts are unified and collectively printed cannot be previewed.

SUMMARY OF THE INVENTION

The invention is made to solve the above problems and it is an object of the invention that a preview which reflects all of layout processing results of layout functions which are executed respectively by an application, a printer driver, and a printer, namely, a result which is actually outputted from the printer is displayed on a host.

Another object of the invention is that layout functions which are provided by an application, a printer driver, and a printer are once designated and outputted from the application and, even after they were temporarily preserved in a client, a result obtained in the case where a print setting is changed by using a function of a job edition is previewed.

It is further another object of the invention that even for a job in which a plurality of different print settings, particularly, layout settings have been designated, a result obtained in the case where the different layouts are collectively printed as they are or the layouts are unified and collectively printed is previewed.

To accomplish the above objects, according to the invention, there is provided an information processing apparatus for forming print data to be transmitted to a printing apparatus, comprising: an intermediate data converter for converting data formed by an application to be printed into data in an intermediate code format and temporarily preserving the intermediate code format data as one print job in a memory; a job composer for forming one composed job by composing a plurality of print jobs preserved by the intermediate data converter; and a preview display controller for obtaining layout information from the intermediate code format data preserved by the intermediate data converter and controlling display of a preview of the composed job on the basis of the layout information.

The information processing apparatus further comprises a setting editor for displaying a user interface to edit a print setting of the preserved intermediate code format data and temporarily preserving the print setting edited by the user interface in association with the intermediate code format data, wherein the layout information is included in the print setting.

The user interface can edit the print setting for the composed job.

The print setting has temporarily been preserved on a print job unit basis. In case of the composed job, a file for the print setting is newly formed for the composed job.

The layout information includes a layout process in the information processing apparatus and a layout process in the printing apparatus.

The apparatus further comprises a print data forming unit for forming print data to be transmitted to the printing apparatus on the basis of the intermediate data format data preserved by the intermediate data converter.

The apparatus further comprises: a draw command forming unit for converting the intermediate data format data preserved by the intermediate data converter into a draw command which can be interpreted by a drawing unit of an OS and outputting; and a print command allocating unit for sending the print command received from the application through the drawing unit of the OS to a spooler and sending the print command received from the draw command forming unit through the drawing unit of the OS to the print data forming unit.

The draw command is a GDI function, the print command is a DDI function, and the print data is a printer language.

The other solving means of the present invention is realized by a method of controlling the above apparatus, a storage medium in which a program for realizing the method has been stored, and a computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram showing an example of a data format which is sent when a print request of a physical page is issued from the spool file manager 304 to the despooler 305;

FIG. 11 is a diagram showing an example of a data format which is sent when a print request of a physical page is issued from the spool file manager 304 to the despooler 305;

FIG. 12 is a diagram showing an example of a data format which is sent when a print request of a physical page is issued from the spool file manager 304 to the despooler 305;

FIG. 13 is a diagram showing an example of a data format which is sent when a print request of a physical page is issued from the spool file manager 304 to the despooler 305;

FIG. 14 is a diagram showing an example of a data format which is sent when a print request of a physical page is issued from the spool file manager 304 to the despooler 305;

FIG. 22 is a flowchart for explaining processes in the UI of the printer driver;

FIG. 23 is a diagram for explaining setting change-limited item information;

DETAILED DESCRIPTION OF THE PREFERRED EMBODIMENTS

First Embodiment

An embodiment suitable for applying the invention will now be described hereinbelow.

Prior to describing processing flowcharts for embodying the invention, a system comprising an information processing apparatus such as a personal computer or the like connected to a printer to which the invention can be applied will be described. Particularly, an explanation will be made with respect to a construction of a print system comprising: a spooler for temporarily preserving print data in a data format (what is called an intermediate code) in a format different from that of print data which is finally sent to the printer before the print data that is once transmitted to the printer is formed on the information processing apparatus; a despooler for newly forming print data to be finally sent to the printer from the data which has temporarily been preserved in the intermediate code format; and a command generator for generating a printer control command.

Figure 1:
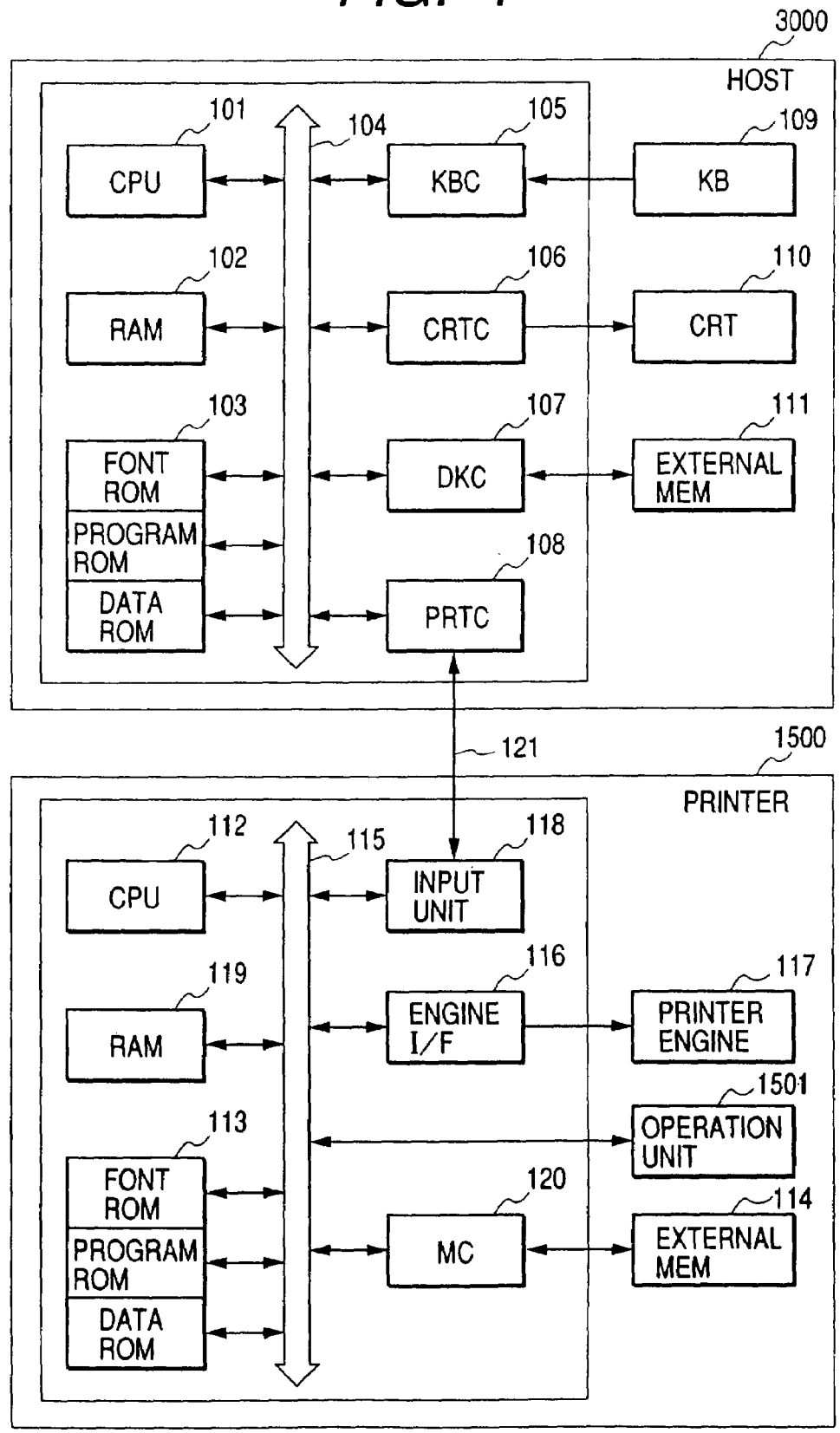
FIG. 1 is a block diagram for explaining a construction of a print control apparatus showing an embodiment of the invention.

FIG. 1 is a block diagram for explaining a construction of a printer control system showing the embodiment of the invention. The invention can be applied to any of sole equipment, a system comprising a plurality of equipment, and a system which is connected through a network such as LAN, WAN, or the like and in which processes are executed so long as the functions of the invention are executed.

In the diagram, a host computer (hereinafter, also simply referred to as a host) 3000 has a CPU 101 for executing processes for a document in which a figure, an image, characters, a table (including a spreadsheet or the like), etc. exist mixedly on the basis of a document processing program or the like stored in a program ROM in an ROM 103 or an external memory 111. The CPU 101 integratedly controls each device connected to a system bus 104. An operating system program (hereinafter, abbreviated to "OS") as a control program of the CPU 101 or the like is stored in the program ROM in the ROM 103 or the external memory 111. Font data or the like which is used at the time of the document process is stored in a font ROM in the ROM 103 or the external memory 111. Various data which is used when the document process or the like is executed is stored in a data ROM in the ROM 103 or the external memory 111. An RAM 102 functions as a main memory, a work area, or the like of the CPU 101.

A keyboard controller (KBC) 105 controls a key input from a keyboard (KB) 109 or a pointing device (not shown). A CRT controller (CRTC) 106 controls a display of a CRT display (CRT) 110. Reference numeral 107 denotes a disk controller (DKC) for controlling an access to the external memory 111 such as hard disk (HD), floppy disk (FD), or the like for storing a boot program, various applications, font data, a user file, an edit file, a printer control command generating program (hereinafter, referred to as a printer driver), and the like. A printer controller (PRTC) 108 is connected to a printer 1500 through a bidirectional interface (interface) 121 and executes a communication control process with the printer 1500. A network can be also used as a bidirectional interface.

The CPU 101 executes, for example, a developing (rasterizing) process of an outline font to a display information RAM set on the RAM 102, thereby enabling "WYSIWYG" on the CRT 110 to be performed. The CPU 101 opens various registered windows on the basis of a command instructed by a mouse cursor or the like (not shown) on the CRT 110 and executes various data processes. When the printing is executed, the user opens a window regarding the print setting and can execute the setting of the printer or the setting of a print processing method for the printer driver including the selection of a printing mode.

The printer 1500 is controlled by a CPU 112. The printer CPU 112 outputs an image signal as output information to a printing unit (printer engine) 117 connected to a system bus 115 on the basis of a control program or the like stored in a program ROM in an ROM 113 or a control program or the like stored in an external memory 114. The control program or the like for the CPU 112 is stored in the program ROM in the ROM 113. Font data or the like which is used when the output information is formed is stored in a font ROM in the ROM 113. In case of a printer which does not have the external memory 114 such as a hard disk or the like, information or the like which is used on the host computer is stored in a data ROM in the ROM 113.

The CPU 112 can perform a communicating process with the host computer through an input unit (operation panel) 118 and can notify the host 3000 of the information or the like in the printer. An RAM 119 is an RAM which functions as a main memory, a work area, or the like of the CPU 112 and is constructed in a manner such that a memory capacity can be expanded by an option RAM which is connected to an expanding port (not shown). The RAM 119 is used as an output information rasterizing area, an environment data storing area, an NVRAM, or the like. An access to the external memory 114 such as hard disk (HD), IC card, or the like is controlled by a memory controller (MC) 120. The external memory 114 is connected as an option and stores font data, an emulation program, form data, and the like. Reference numeral 118 denotes the operation panel on which switches for operation, an LED display, and the like are arranged.

As for the external memory 114, the number of memories is not limited to one but a plurality of memories can be also provided. That is, it can be also constructed in a manner such that a plurality of option cards in addition to built-in fonts and a plurality of external memories in each of which a program to interpret printer control languages of different language systems has been stored can be connected. Further, it is also possible to have an NVRAM (not shown) and store printer mode setting information from an operation panel 1501.

Figure 2:
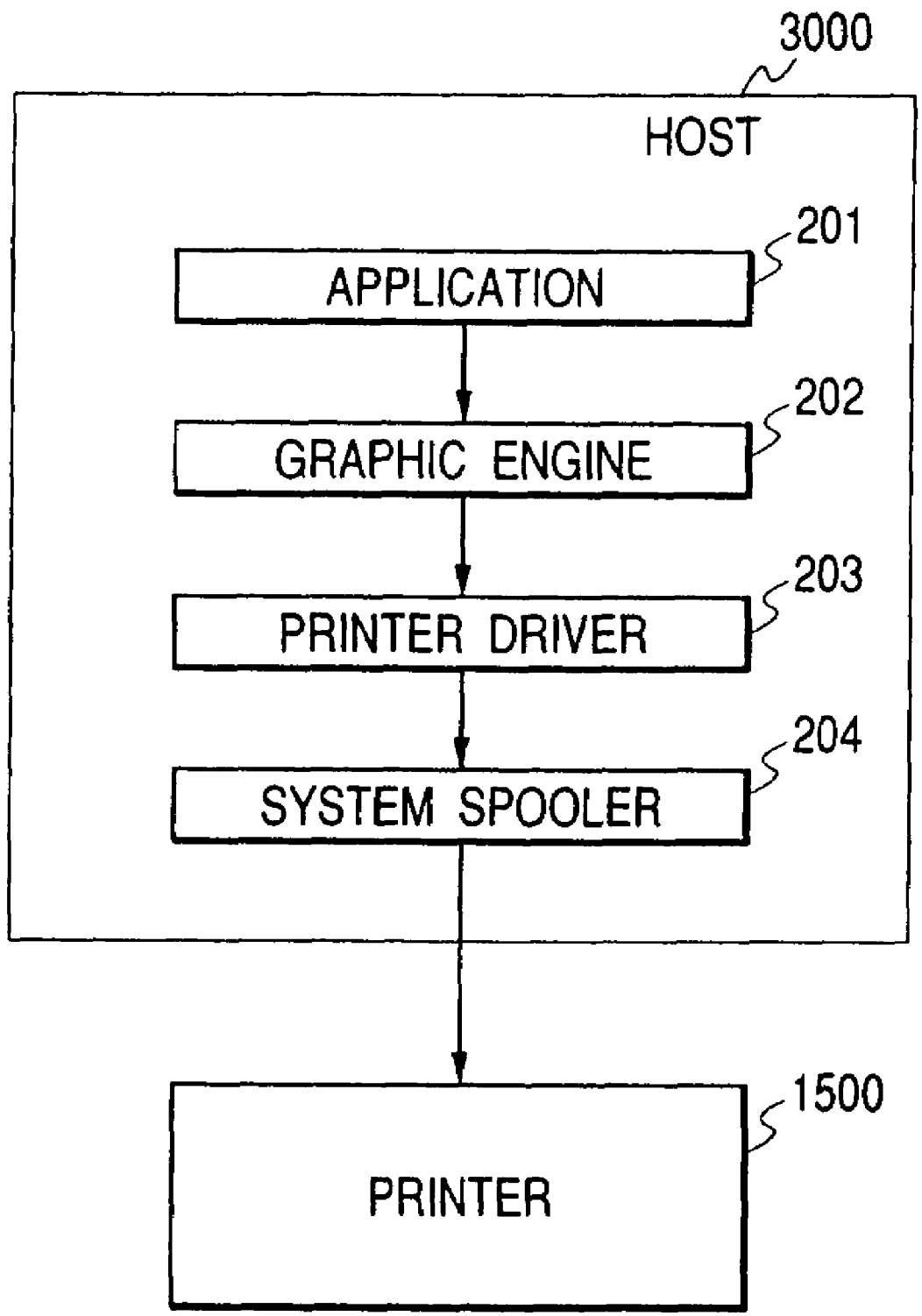
FIG. 2 is a block diagram showing a construction of a typical print system of a host computer to which a printer is connected.

FIG. 2 is a constructional diagram of a typical printing process in the host computer to which a printing apparatus such as a printer or the like is directly connected or connected via the network. An application 201, a graphic engine 202, a printer driver 203, and a system spooler 204 are program modules which exist as files preserved in the external memory 111. When such a program module is executed, it is loaded into the RAM 102 by the OS or a module which uses such a module and executed. The application 201 and printer driver 203 can be added to the FD of the external memory 111 or a CD-ROM (not shown) or to the HD of the external memory 111 via the network (not shown). The application 201 preserved in the external memory 111 is loaded in the RAM 102 and executed. However, when the printing is instructed by the printer 1500 from the application 201, the print data is outputted (drawn) by using the graphic engine 202 which is similarly loaded into the RAM 102 and can be executed.

The graphic engine 202 similarly loads the printer driver 203 prepared for every printing apparatus from the external memory 111 into the RAM 102 and sets an output of the application 201 to the printer driver 203. The graphic engine 202 converts a GDI (Graphic Device Interface) function received from the application 201 into a DDI (Device Driver Interface) function and outputs the DDI function to the printer driver 203. On the basis of the DDI function received from the graphic engine 202, the printer driver 203 converts it into a control command which can be recognized by the printer, for example, a PDL (Page Description Language). The converted printer control command is outputted as print data to the printer 1500 by the OS via the interface 121 through the system spooler 204 loaded in the RAM 102.

Figure 3:
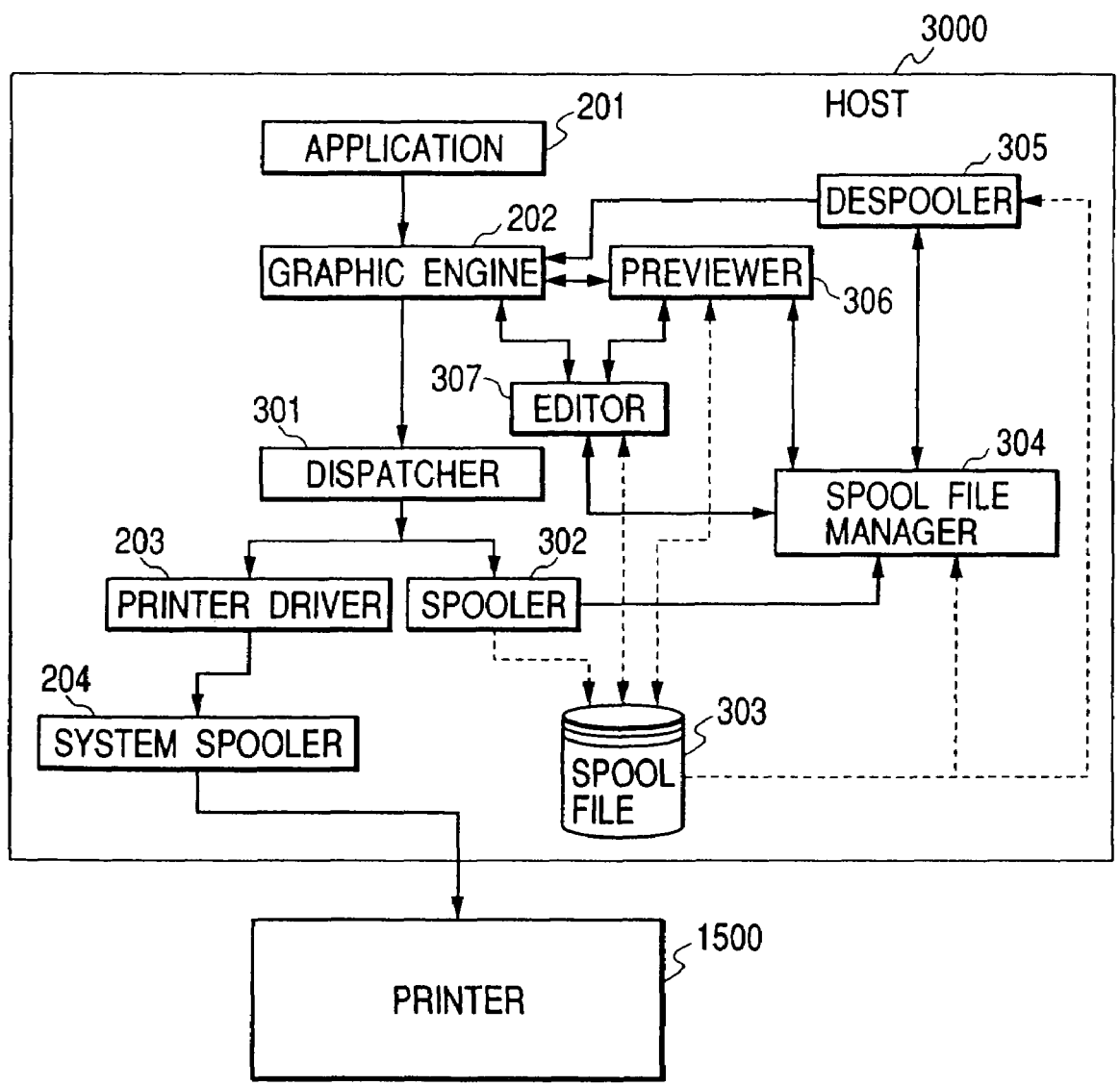
FIG. 3 is a block diagram showing a construction of a print system for once spooling an intermediate code before a print command from an application is converted into a printer control command.

In addition to the print system comprising the printer and the host computer shown in FIG. 2, a print system according to the embodiment further has a construction such that the print data from the application is once spooled by intermediate code data as shown in FIG. 3.

FIG. 3 is a diagram showing an expanded system of the system of FIG. 2 and has a construction such that when a print command is sent from the graphic engine 202 to the printer driver 203, a spool file 303 comprising an intermediate code is once generated. In the system of FIG. 2, the application 201 is released from the printing process at a point when the printer driver 203 has finished the conversion from all of the print commands from the graphic engine 202 into control commands for the printer. On the other hand, in the system of FIG. 3, it is released at a point when a spooler 302 has converted all print commands into intermediate code data and outputted them to the spool file 303. Usually, the processes in the latter case are finished in a shorter time. In the system shown in FIG. 3, the contents in the spool file 303 can be modified. Thus, a function which the application does not have, namely, a function such that the print data is enlarged or reduced, a plurality of pages are reduced to one page and printed, or the like can be realized for the print data from the application.

To accomplish those objects, the system of FIG. 2 is expanded so as to spool the print data by the intermediate code data as shown in FIG. 3. To modify the print data, it is generally set from the window provided by the printer driver 203 and the printer driver 203 stores the set contents into the RAM 102 or external memory 111.

The details of FIG. 3 will be described hereinbelow. As shown in the diagram, according to the expanded processing system, a dispatcher 301 receives the DDI function as a print command from the graphic engine 202. In the case where the print command (DDI function) received by the dispatcher 301 from the graphic engine 202 is based on the print command (GDI function) issued from the application 201 to the graphic engine 202, the dispatcher 301 loads the spooler 302 stored in the external memory 111 into the RAM 102 and sends the print command (DDI function) to the spooler 302 instead of the printer driver 203.

The spooler 302 analyzes the received print command, converts it into intermediate codes page by page, and outputs them to the spool file 303. The spool file of the intermediate codes stored page by page is called PDF (Page Description File). The spooler 302 obtains the print modification settings (Nup, duplex, stapling, color/monochrome designation, etc.) regarding the print data which have been set to the printer driver 203 from the printer driver 203 and preserves them as a file of the job unit into the spool file 303. The setting file stored on the job unit basis is called a job setting file (also referred to as an abbreviation name "SDF" (Spool Description File). The job setting file will be explained hereinlater. Although the spool file 303 is generated as a file onto the external memory 111, it can be also generated on the RAM 102. Further, the spooler 302 loads a spool file manager 304 stored in the external memory 111 into the RAM 102 and notifies the spool file manager 304 of a generating situation of the spool file 303. After that, the spool file manager 304 discriminates whether the printing can be performed in accordance with the print modification setting regarding the print data preserved in the spool file 303 or not.

When it is determined by the spool file manager 304 that the printing can be performed by using the graphic engine 202, a despooler 305 stored in the external memory 111 is loaded into the RAM 102 and the despooler 305 is instructed so as to perform a printing process of the page description file of the intermediate code described in the spool file 303.

The despooler 305 modifies the PDF of the intermediate code included in the spool file 303 in accordance with the job setting file including the print modification setting information included in the spool file 303, forms the GDI function again, and outputs the GDI function again via the graphic engine 202.

If the print command (DDI function) received by the dispatcher 301 from the graphic engine 202 is based on the print command (GDI function) issued from the despooler 305 to the graphic engine 202, the dispatcher 301 sends the print command to the printer driver 203 instead of the spooler 302.

The printer driver 203 forms a printer control command comprising a page description language or the like on the basis of the DDI function obtained from the graphic engine 202 and outputs it to the printer 1500 via the system spooler 204.

In addition to the expanded system described so far, FIG. 3 shows an example in which a previewer 306 and a setting change editor 307 are further arranged, thereby enabling the preview, print setting change, and composing of a plurality of jobs.

Figure 9:
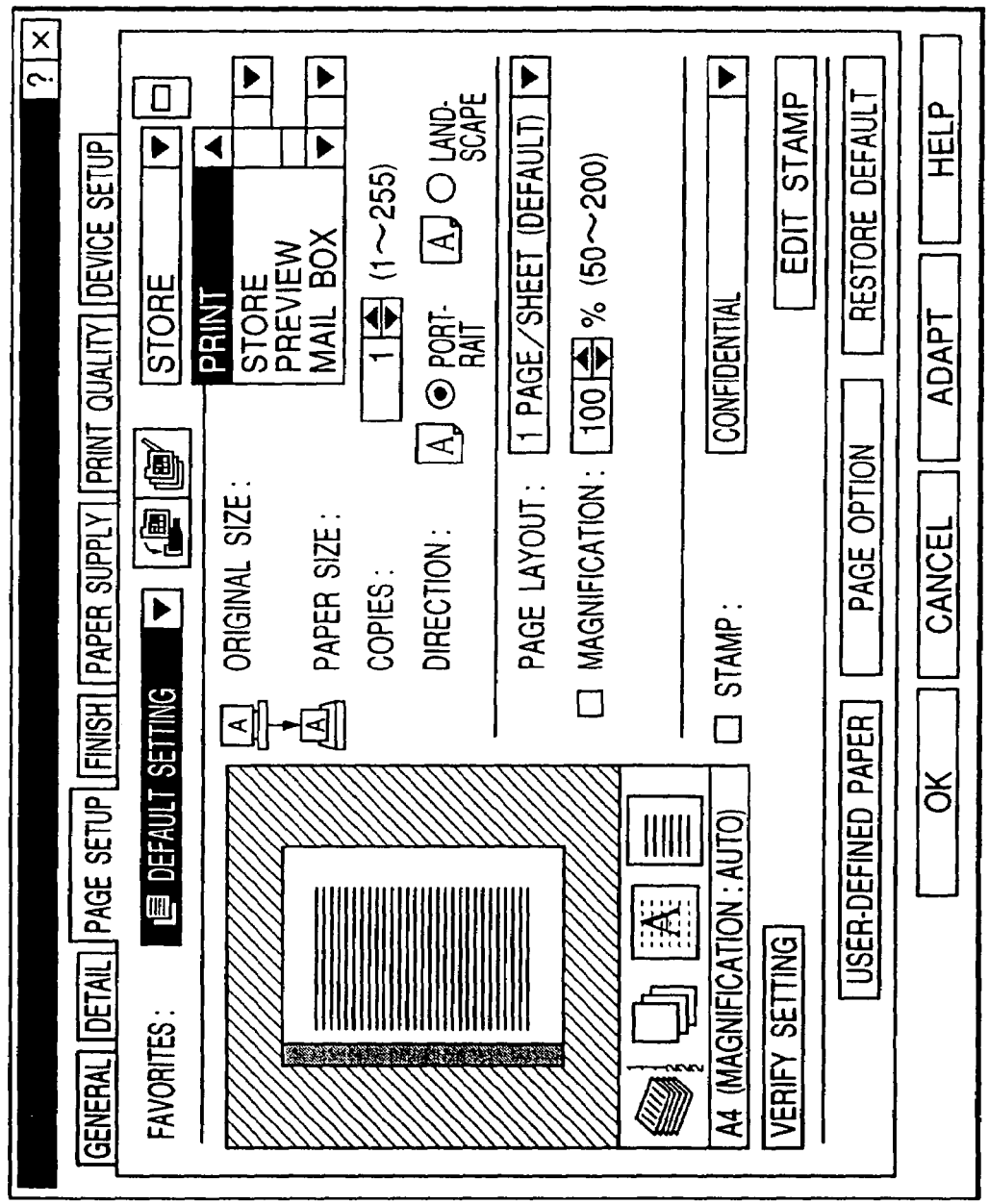
FIG. 9 shows an example of a print spool setting picture plane.

To perform the print preview, the print setting change, and the composing of a plurality of jobs, first, the user needs to designate "store" in a pull-down menu as means for performing "designation of an output destination" on a property of the printer driver shown in FIG. 9. If the user wants to see only the preview, the above processes can be also performed by selecting "preview" as a designation of the output destination.

Figure 16:
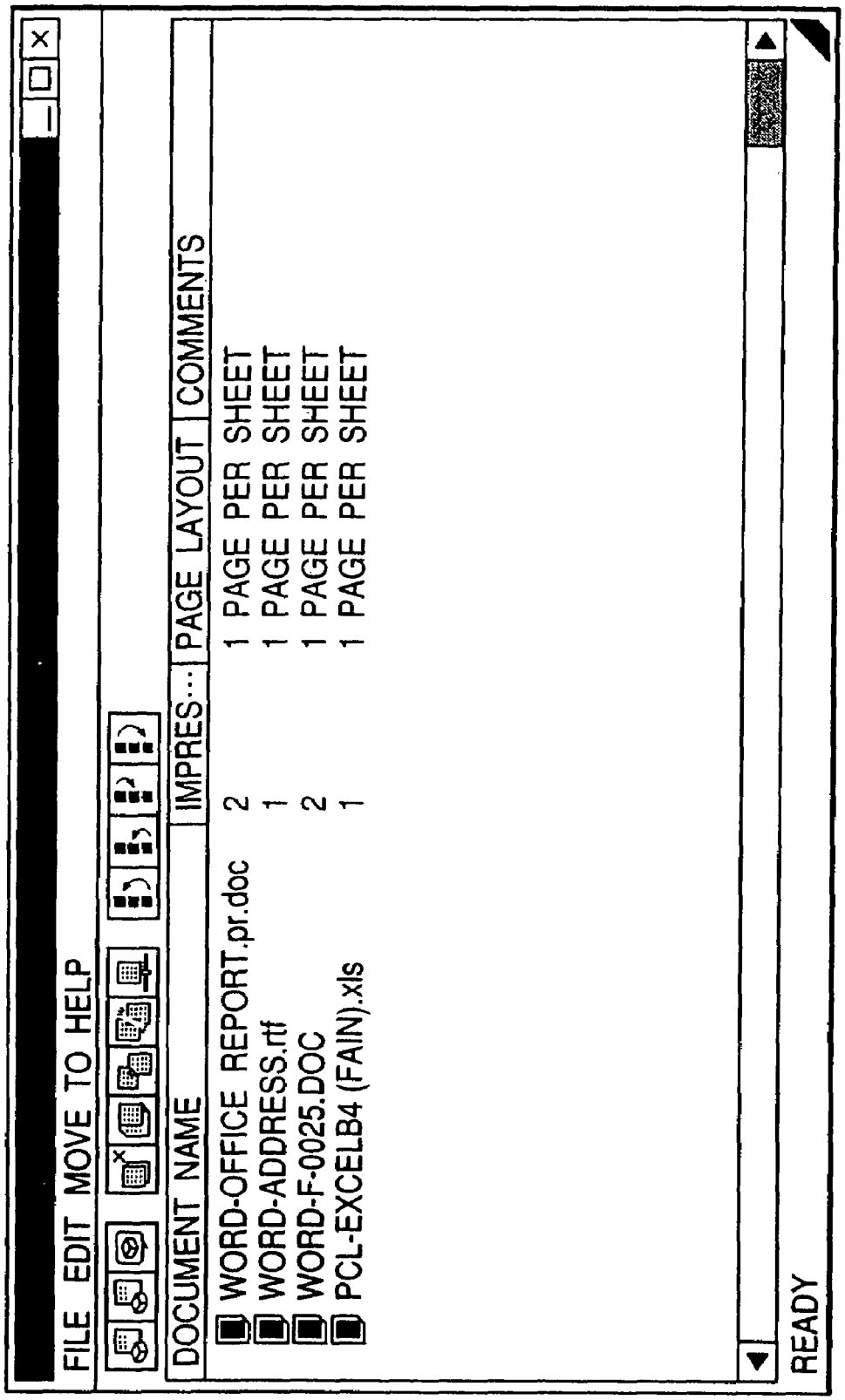
FIG. 16 shows an example of a picture plane for displaying a list of print jobs spooled in the spool file manager 304.

The contents set on the property of the printer driver as mentioned above are stored in a structure (called DEVMODE in the Windows OS) which is provided as a setting file by the OS. For example, the setting about whether data is stored in the spool file manager 304 during the print modification setting included in the spool file 303 or not is included in the structure. The spool file manager 304 reads the print modification setting through the printer driver and if the storage has been designated, the page description file and the job setting file are generated and stored in the spool file 303 as mentioned above. As shown in FIG. 16, a window picture plane of the spool file manager is popped up and a list of the jobs spooled in the spool file 303 is displayed. FIG. 16 shows an example in which four jobs have been spooled. The job can be operated by pressing a menu bar or a menu icon right under it. The number of operations of the menu bar and that of the menu icon are the same. As kinds of operations, there are the following twelve operations: "print" to print in a state where the job has been selected; "save and print" in which the spool file of the intermediate code is left as it is and the printing is performed; "preview" to see an output preview of the job in consideration of the print setting; "delete" to delete the spool file of the intermediate code; "copy" to form a copy of the spool file of the intermediate code; "compose" to compose the jobs in the spool file of a plurality of intermediate codes and form one job; "divide" to divide the composed job into a plurality of original jobs; "edit job" to change the print setting (layout setting, finishing setting, or the like) of the single job or composed job; "move to head" to set the printing order of a certain job to the head; "move upward by one" to advance the printing order of a certain job by one; "move downward by one" to delay the printing order of a certain job by one; and "move to last" to set the printing order of a certain job to the last.

When a preview of a certain single job or composed job is designated on the window picture plane (FIG. 16) of the spool file manager, the previewer 306 stored in the external memory 111 is loaded in the RAM 102 and the previewer 306 is instructed to perform a preview process of the job of the intermediate code described in the spool file 303.

The previewer 306 sequentially reads out the page description files (PDF) of the intermediate codes included in the spool file 303, modifies them in accordance with the contents of the print modification setting information included in the job setting file (SDF) stored in the spool file 303, and outputs the GDI function to the graphic engine 202. The graphic engine 202 outputs the drawing data to its own client area, thereby enabling the data on the picture plane to be outputted.

The graphic engine 202 can perform a proper rendering in accordance with the designated output destination. Therefore, in a manner similar to the despooler 305, the previewer 306 can be realized by a method whereby the intermediate codes included in the spool file 303 are modified in accordance with the contents of the print modification setting included in the spool file 303 and outputted by using the graphic engine 202. The print modification setting set by the printer driver is stored as a job setting file into the spool file 303 and the data of the page description file is modified on the basis of the job setting file and outputted as mentioned above. Thus, how the actual drawing data is printed can be presented to the user. Further, in the cases where the Nup (a process for reducing and arranging N logical pages onto one physical page and printing) is designated, where the print data is printed in a duplex mode, where a binding printing is designated, and where a stamp is designated, a print preview close to an image which will be outputted by the printer can be presented to the user in accordance with each case. According to the preview function such as a conventional document formation or the like which the application software has, since the print data is drawn on the basis of the page setting in its application, the print setting in the printer driver is not reflected and it is impossible to allow the user to recognize a preview which is actually printed and outputted.

Figure 17:
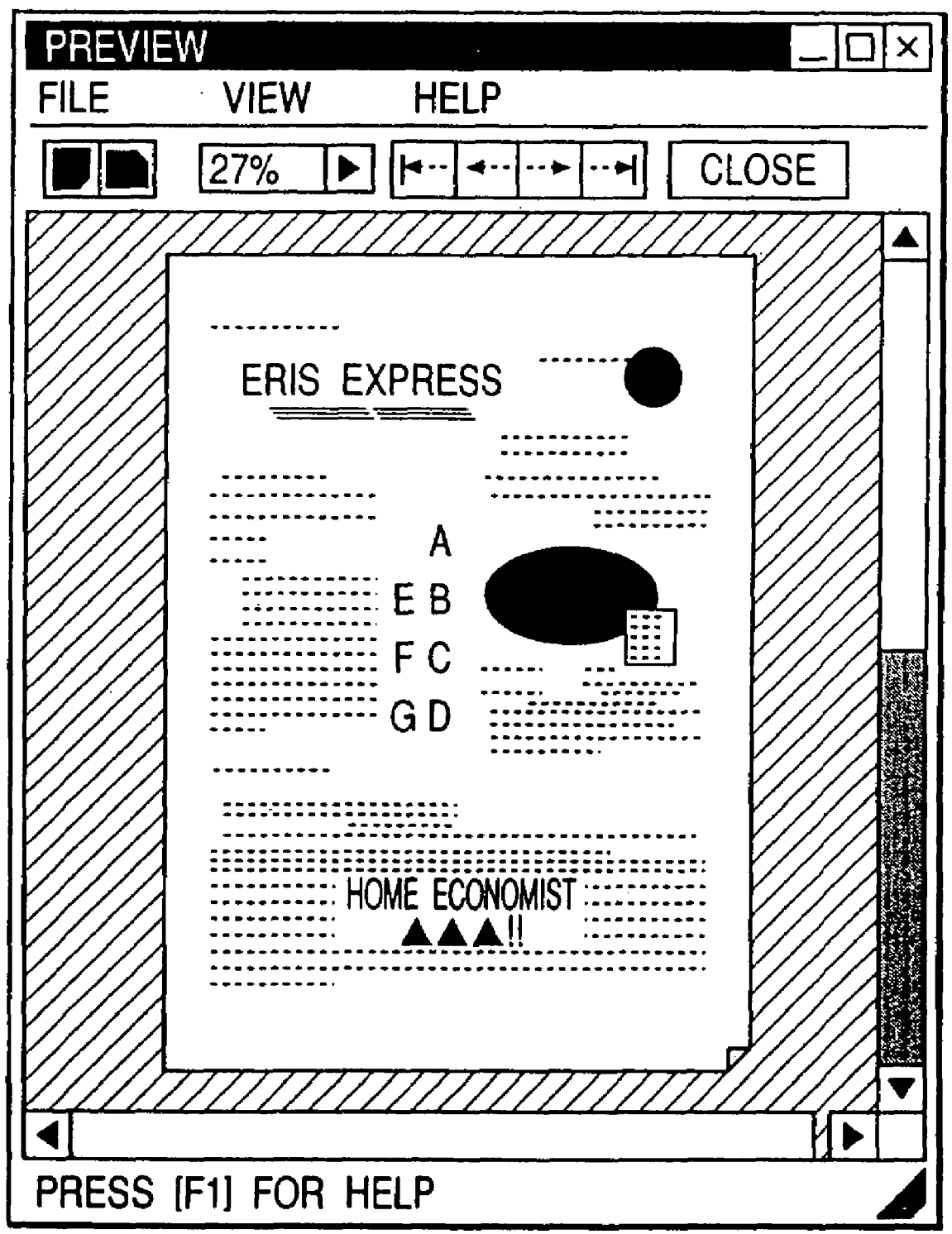
FIG. 17 shows an example of a picture plane of a previewer 306.

By performing the preview process as mentioned above, a large preview of the print modification setting of the printing included in the spool file 303 is displayed on the picture plane by the previewer 306 as shown in FIG. 17 and, after that, the previewer 306 is closed by a non-display instruction of the user and the control is shifted to the window picture plane (FIG. 16) of the spool file manager.

If the user prints in accordance with the contents displayed by the previewer 306, he issues a print request by designating "print" or "save and print" on the spool file manager 304. In response to the print request, as mentioned above, the GDI function is formed by modifying the page description file by the despooler 305 on the basis of the job setting file and sent to the graphic engine 202. The print command is transmitted to the printer driver 203 via the dispatcher 301 and the printing is executed.

The setting change using the editor 307 will now be described.

As a realizing method, it is possible to set with respect to the "store" designated job in FIG. 9 in a manner similar to the preview. The spool file manager 304 is popped up and a list of the spooled jobs is displayed in a manner similar to the preview. In the case where "edit job" is designated and the setting change is instructed on the window picture plane (FIG. 16) of the spool file manager, the editor 307 stored in the external memory 111 is loaded in the RAM 102 and the editor 307 is instructed so as to display the current or default print modification setting. A job setting picture plane as shown in FIG. 18 is displayed.

Figure 18:
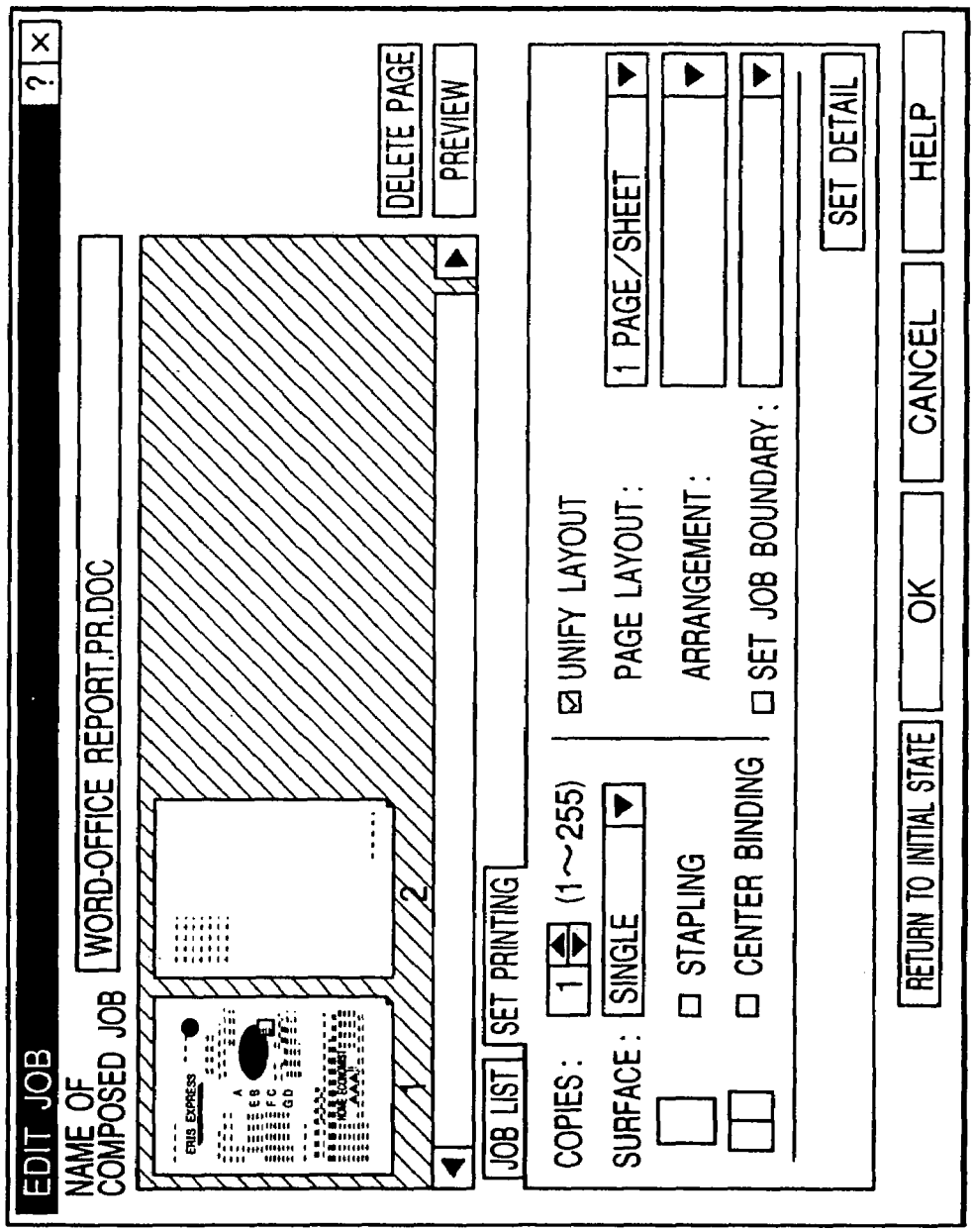
FIG. 18 shows an example of a picture plane of the setting change editor 307.

The editor 307 obtains the job setting file of the job in which "edit job" has been designated from the spool file 303 and changes a default value on the job setting picture plane of FIG. 18 on the basis of the set items designated in the job setting file. In the example shown in FIG. 18, "copies (the number of copies): 1", "surface (printing method): single", "stapling: none", "layout: 1 page/sheet", and the like are designated in the job setting file of the job in which "edit job" has been designated.

Even in the editor 307, the page description file of the intermediate code included in the spool file 303 is modified in accordance with the contents of the print modification setting included in the job setting file stored in the spool file 303 and outputted to its own client area by using the graphic engine 202, so that a small preview on the picture plane shown in FIG. 18 can be outputted.

The contents of the print modification setting included in the job setting file stored in the spool file 303 can be changed or corrected. In this instance, even if the user interface on the editor 307 can also hold the settable items of the printer driver 203 or the user interface of the printer driver 203 itself can be also called. As shown in FIG. 18, the number of copies, the printing method (single, duplex, binding printing), stapling (saddle stitch or the like), the page layout, the arrangement, and the like can be designated. By pressing "set detail", most of the items which can be designated by the printer driver can be reset. It is assumed that the change of the setting regarding the print quality such as resolution, graphic mode, and the like is not permitted.

The change of the changed items is authenticated in accordance with an authenticating request on the editor 307 and the control is shifted to the spool file manager 304. Although the change of the print setting is preserved with respect to the items in which the change has been authenticated, it is not preserved in the original job setting file but a job output setting file which is used for job edition or the like is newly formed and preserved. The details of the job output setting file will be described in conjunction with FIG. 10 and subsequent drawings.

If the user prints in accordance with the set change contents in a manner similar to the confirmation by the previewer 306, he issues the print request on the spool file manager 304. The print request is sent to the graphic engine 202. The print command is transmitted to the printer driver 203 via the dispatcher 301 and the printing is executed.

In the window picture plane (FIG. 16) of the spool file manager, it is possible to designate so that a plurality of print jobs are composed and printed as one print job. The use of the job in which the output destination has been designated to "store" in the property of the printer driver in FIG. 9 is presumed as a prerequisite in a manner similar to the preview and the setting change.

When the print jobs are composed, the user first calls the printer driver 203 from the application 201 and selects "store" from the user interface as shown in FIG. 9. In a manner similar to the above, the file is stored in the spool file 303 by this selection and the window picture plane (FIG. 16) of the spool file manager is popped up as shown in FIG. 16. A list of the spooled jobs is displayed on the window of the spool file manager. By performing the similar operation from the application 201, a list of a plurality of jobs is displayed on the spool file manager 304.

When a plurality of jobs are selected and "compose" is designated, the editor 307 stored in the external memory 111 is loaded in the RAM 102 and the editor 307 is instructed so as to display the print modification setting of the head job on the list or the default. A joint setting picture plane as shown in FIG. 18 is displayed. Although the editor 307 is used as a joint setting picture plane here, another module can be also used.

The editor 307 modifies the page description file of the intermediate codes included in the spool file 303 in accordance with the contents of the print modification setting included in the job setting information and outputs the modified file to its own client area by using the graphic engine 202 in response to all of the jobs designated as a composed job, thereby outputting it onto the picture plane. In this instance, a small preview of all of the selected jobs can be performed in the preview area shown in FIG. 18. When the composed job is formed, a job output setting file in which the job setting file of each single job has been expanded is generated. The job output setting file is generated even when the job edition is performed, one file is generated for one job, and one file is generated even in case of the composed job.

In this instance, each job can be displayed by the print modification setting before composing or can be also modified and corrected to a unified print modification setting as a composed job and displayed. At this time, the user interface on the editor 307 can hold the settable items of the printer driver 203 or the user interface of the printer driver 203 itself can be also called.

As mentioned above, as for the composed job and the changed items, the change is authenticated in response to an authenticating request on the editor 307 and the control is shifted to the spool file manager 304. By those operations, a plurality of jobs selected before are displayed as one composed job on the window of the spool file manager.

In a manner similar to the confirmation by the previewer 306, if the printing is performed in accordance with the contents of the setting change, the user issues a print request on the spool file manager 304. The print request is sent to the graphic engine 202, the print command is transmitted to the printer driver 203 via the dispatcher 301, and the printing is executed.

Figure 4:
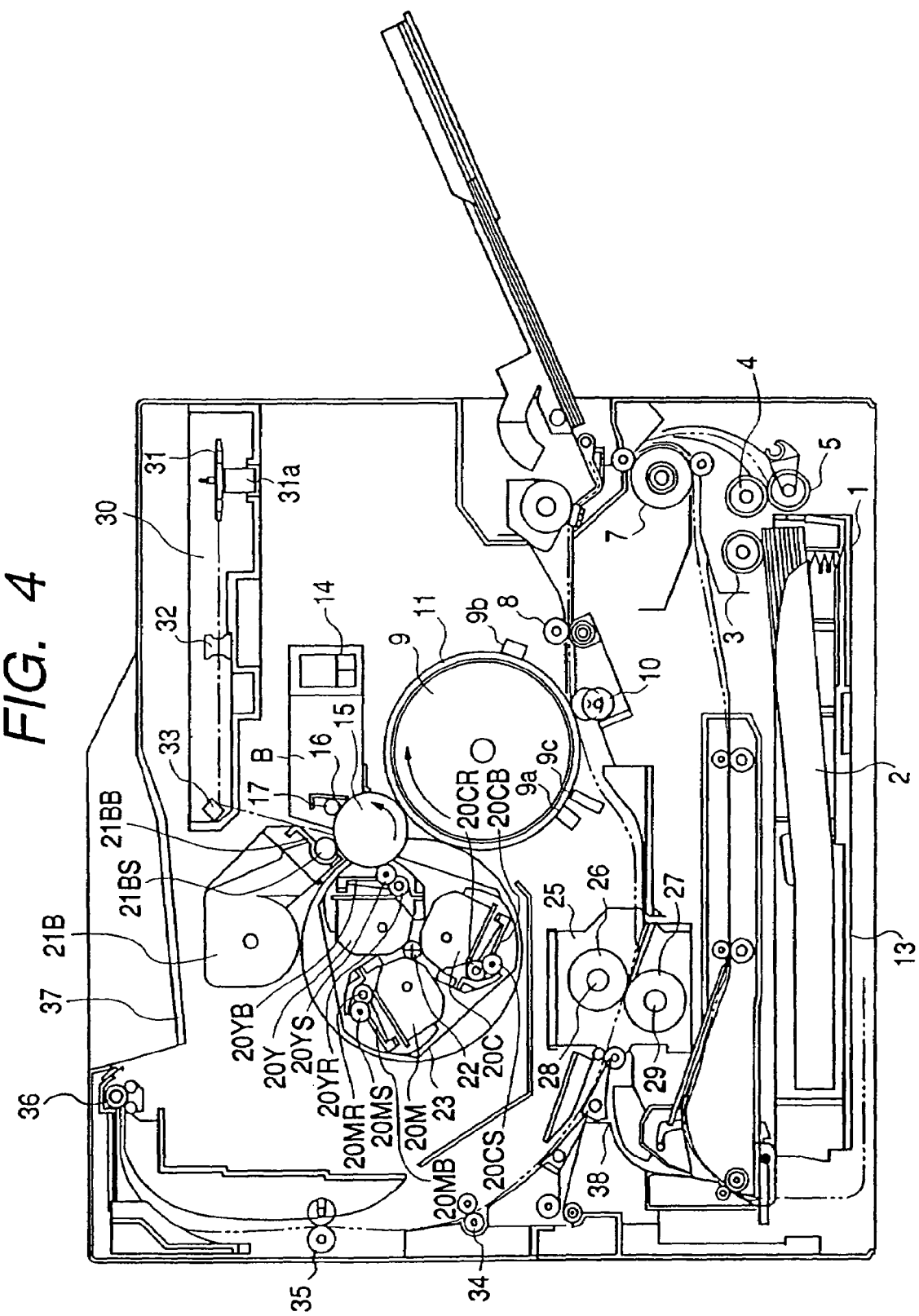
FIG. 4 is a diagram for explaining the printer in the invention.

FIG. 4 is a cross sectional view of a color laser printer having a duplex printing function as an example of the printer 1500.

According to this printer, a laser beam modulated by image data of each color obtained on the basis of the print data inputted from the host computer 3000 is scanned onto a photosensitive drum 15 by a polygon mirror 31, thereby forming an electrostatic latent image. The electrostatic latent image is developed by toner, thereby obtaining a visible image. The visible images of all colors are multiplex transferred onto an intermediate transfer member 9, thereby forming a color visible image. Further, the color visible image is transferred to a transfer material 2 and fixed thereon. An image forming unit for performing the above control is constructed by: a drum unit having the photosensitive drum 15; a primary charging unit having a contact type charging roller 17; a cleaning unit; a developing unit; the intermediate transfer member 9; a paper feeding unit including a sheet cassette 1 and various rollers 3, 4, 5, and 7; a transfer unit including a transfer roller 10; and a fixing unit 25.

The drum unit is formed by integratedly constructing: the photosensitive drum (photosensitive material) 15; and a cleaner vessel 14 also serving as a holder of the photosensitive drum 15 and having a cleaning mechanism. The drum unit is detachably supported to the printer main body and can be easily exchanged in accordance with a life time of the photosensitive drum 15. The photosensitive drum 15 is formed by coating an organic photoconductive material layer onto the outer peripheral surface of an aluminum cylinder and rotatably supported to the cleaner vessel 14. A driving force of a driving motor (not shown) is transferred to the photosensitive drum 15, so that it is rotated. The driving motor rotates the photosensitive drum 15 counterclockwise in accordance with the image forming operation. The electrostatic latent image is formed by selectively exposing the surface of the photosensitive drum 15. In a scanner unit 30, the modulated laser beam is reflected by the polygon mirror which is rotated by a motor 31a synchronously with a horizontal sync signal of the image signal and irradiates the photosensitive drum through a lens 32 and a reflecting mirror 33.

In order to visualize the electrostatic latent image, the developing unit has a construction comprising: three color developing devices 20Y, 20M, and 20C for performing the development of yellow (Y), magenta (M), and cyan (C); and one black developing device 21B for performing the development of black (B). The color developing devices 20Y, 20M, and 20C and the black developing device 21B have: sleeves 20YS, 20MS, 20CS, and 21BS; and coating blades 20YB, 20MB, 20CB, and 21BB which are come into pressure contact with outer peripheries of those sleeves 20YS, 20MS, 20CS, and 21BS, respectively. The three color developing devices 20Y, 20M, and 20C have coating rollers 20YR, 20MR, and 20CR, respectively.

The black developing device 21B is detachably attached to the printer main body. The color developing devices 20Y, 20M, and 20C are detachably attached to a developing rotary 23 which rotates around a rotary axis 22 as a center.

The sleeve 21BS of the black developing device 21B is arranged so as to have a very small interval of, for example, about 300 μm from the photosensitive drum 15. The black developing device 21B conveys toner by a feeding member built therein and applies charges to the toner by a frictional charging so as to be coated by the coating blade 21BB onto the outer peripheral surfaces of the sleeve 21BS which rotates clockwise. By applying a developing bias to the sleeve 21BS, a development is performed to the photosensitive drum 15 in accordance with the electrostatic latent image, thereby forming a visible image onto the photosensitive drum 15 by black toner.

The three color developing devices 20Y, 20M, and 20C are rotated in association with the rotation of the developing rotary 23 at the time of image formation. The predetermined sleeves 20YS, 20MS, and 20CS face the photosensitive drum 15 so as to have a very small interval of about 300 μm. Thus, the predetermined color developing devices 20Y, 20M, and 20C are stopped at the developing positions which face the photosensitive drum 15 and a visible image is formed on the photosensitive drum 15.

At the time of the formation of a color image, the developing rotary 23 rotates every rotation of the intermediate transfer member 9 and the developing processes are performed in order of the yellow developing device 20Y, magenta developing device 20M, cyan developing device 20C, and subsequently, black developing device 21B. The intermediate transfer member 9 rotates four times and visible images are sequentially formed by the yellow, magenta, cyan, and black toner, so that a full color visible image is formed on the intermediate transfer member 9.

The intermediate transfer member 9 is come into contact with the photosensitive drum 15 and rotates in association with the rotation of the photosensitive drum 15. At the time of the formation of a color image, the intermediate transfer member 9 rotates clockwise and is subjected to a multiplex transfer of the visible images of four times from the photosensitive drum 15. At the time of the image formation, the transfer roller 10, which will be explained hereinbelow, is come into contact with the intermediate transfer member 9 and sandwiches and conveys the transfer material 2, thereby allowing the color visible images on the intermediate transfer member 9 to be simultaneously multiplex transferred onto the transfer material 2. A TOP sensor 9a and an RS sensor 9b for detecting the position regarding the rotating direction of the intermediate transfer member 9 and a density sensor 9c for detecting a density of the toner image transferred onto the intermediate transfer member are arranged on the outer peripheral portion of the intermediate transfer member.

The transfer roller 10 has a transfer charging device supported to the photosensitive drum 15 so that it can be come into contact with and removed from the drum 15. The transfer roller 10 is formed by winding an expanded elastic material having a middle resistance around a metal axis.

While the color visible image is being multiplex transferred onto the intermediate transfer member 9 as shown by a solid line in FIG. 4, the transfer roller 10 is downwardly away from the member 9 so as not to disturb the color visible image. After the color visible images of four colors were formed on the intermediate transfer member 9, the transfer roller 10 is positioned to an upward location shown by a broken line in the diagram by a cam member (not shown) in accordance with the timing of transferring the color visible images onto the transfer material 2. Thus, the transfer roller 10 is come into contact with the intermediate transfer member 9 with a predetermined pressure through the transfer material 2. A bias voltage is applied to the transfer roller 10, so that the color visible images on the intermediate transfer member 9 are transferred onto the transfer material 2.

The fixing unit 25 is provided to fix the transferred color visible images while conveying the transfer material 2 and has: a fixing roller 26 for heating the transfer material 2; and a pressing roller 27 for allowing the transfer material 2 to be come into contact with the fixing roller 26. The fixing roller 26 and pressing roller 27 are formed in a hollow shape and have heaters 28 and 29 therein, respectively. That is, the transfer material 2 holding the color visible images is conveyed by the fixing roller 26 and pressing roller 27 and the toner is fixed onto the surface by applying the heat and pressure.

After the color visible images were fixed, the transfer material 2 is ejected to a paper ejecting portion 37 by paper ejecting rollers 34, 35, and 36 and the image forming operation is finished.

The cleaning means is provided to clean the toner remaining on the photosensitive drum 15 and intermediate transfer member 9. The waste toner remaining after the visible image based on the toner formed on the photosensitive drum 15 was transferred onto the intermediate transfer member 9 or the waste toner remaining after the color visible images of four colors formed on the intermediate transfer member 9 were transferred onto the transfer material 2 is stored in the cleaner vessel 14.

The transfer material (recording paper) 2 to be printed is taken out of a paper feed tray 13 by a paper feed roller 3 and conveyed so as to be sandwiched between the intermediate transfer member 9 and transfer roller 10. The color toner image is recorded on the transfer material 2. The transfer material 2 passes through the fixing unit 25 and the toner image is fixed. In case of the single printing mode, a guide 38 forms a conveying path so as to guide the recording paper to the upper paper ejecting portion. However, the guide 38 forms a path so as to guide the paper to a lower duplexing unit in the duplex printing mode.

The recording paper guided to the duplexing unit is once fed into a portion (conveying path shown by an alternate long and two short dashes line) under the tray 13 by an obverse/reverse conveying roller 40 and, thereafter, conveyed in the reverse direction, and sent to a duplex tray 39. On the duplex tray 39, the obverse/reverse of the paper are reversed to a state opposite to that of the paper put on the paper feed tray 13 and the front/rear in the conveying direction are also reversed. By performing again the transfer and fixing of the toner image in this state, the duplex printing can be performed.

Figure 5:
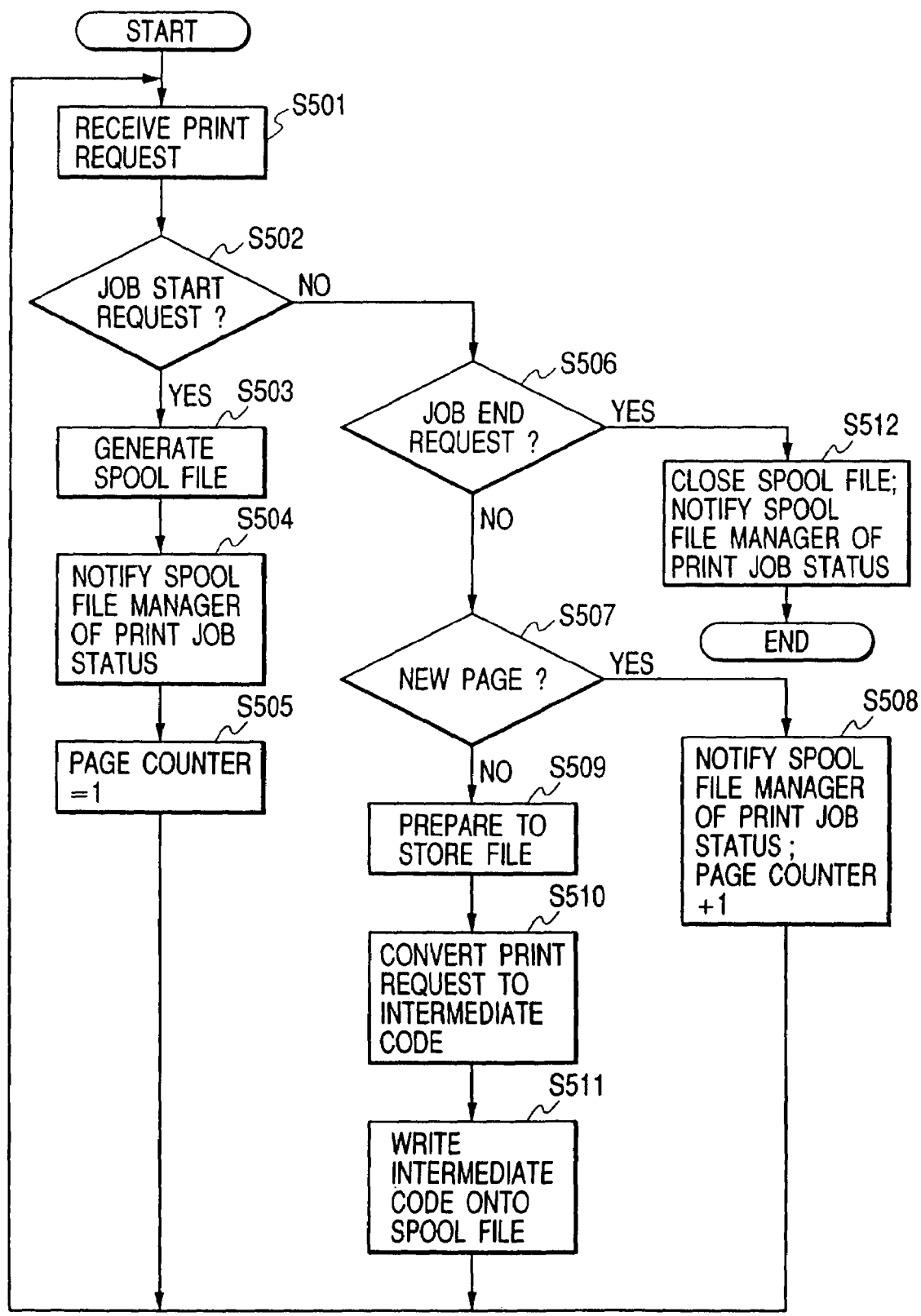
FIG. 5 is a flowchart showing processes in a spooler 302.

FIG. 5 shows a flowchart for processes in the spooler 302 in the step of preserving page by page in the generation of the spool file 303.

Figure 8:
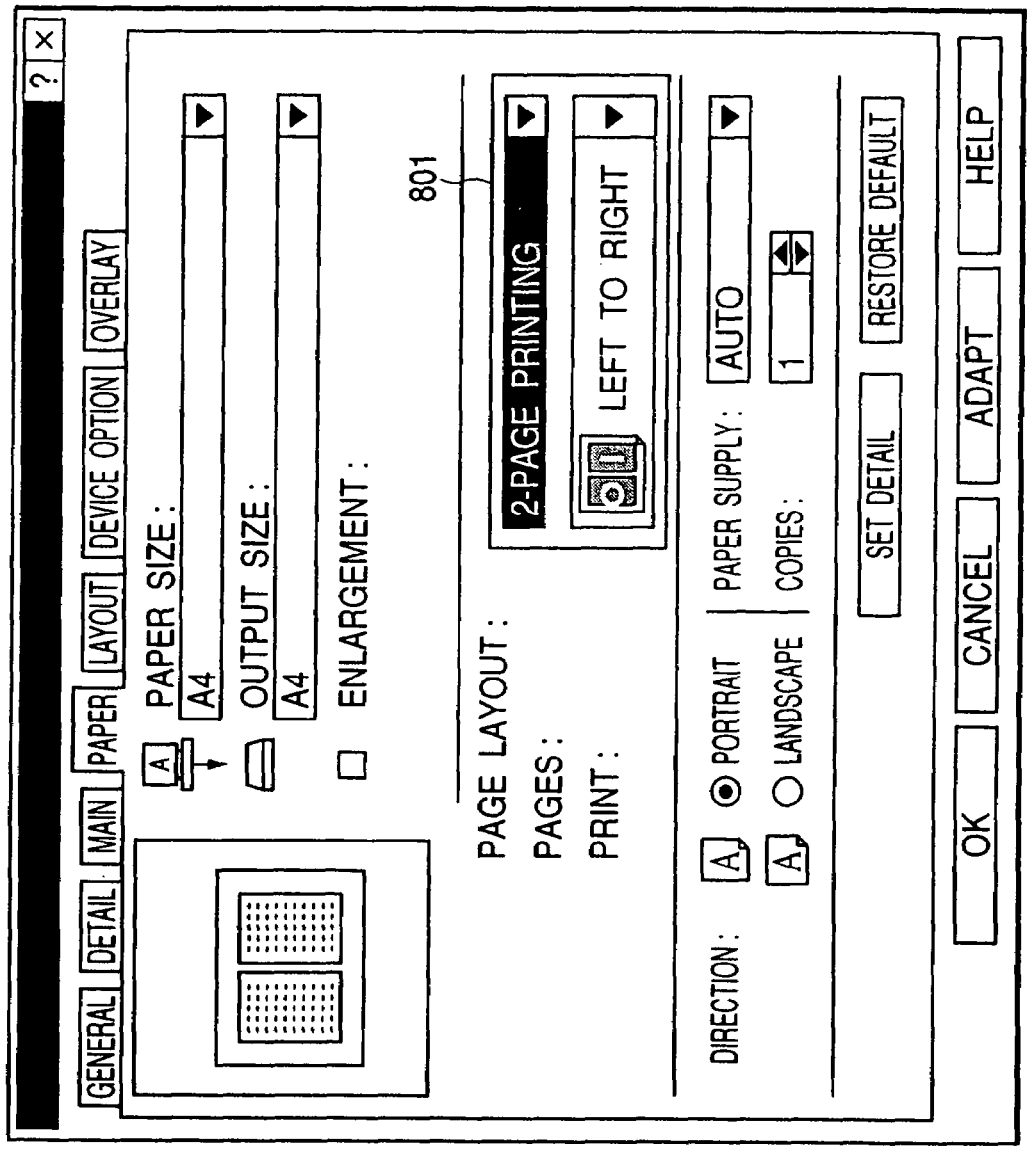
FIG. 8 shows an example of a print setting picture plane.

First, in step S501, the spooler 302 receives the print request from the application through the graphic engine 202. In the application, a dialog for inputting a print setting as shown in FIG. 8 is displayed and the print setting inputted from the dialog is sent to the spooler 302 from the printer driver. The setting input dialog shown in FIG. 8 includes setting items such that the number of logical pages which are arranged in one physical page as shown at 801 is determined and the like.

In step S502, the spooler 302 discriminates whether the received print request is a job start request or not. If it is determined in step S502 that it is the job start request, step S503 follows. The spooler 302 generates the spool file 303 for temporarily preserving the intermediate data. Subsequently, in step S504, the spooler 302 notifies the spool file manager 304 of a print job status. In step S505, a page number counter of the spooler 302 is initialized to "1". In the spool file manager 304, the information of the job, the print modification setting, and the like for the job whose printing has been started are read out from the spool file 303 and stored.

If it is determined in step S502 that it is not the job start request, step S506 follows.

In step S506, the spooler 302 discriminates whether the received request is a job end request or not is discriminated. If it is determined that it is not the job end request, step S507 follows. Whether it is a new page request or not. If it is decided in step S507 that it is the new page request, step S508 follows. The spooler 302 notifies the spool file manager 304 of the print job status. The page number counter is increased by 1, the page description file in which the intermediate code has been stored is closed, and a next page description file is generated.

If it is determined in step S507 that the received print request is not the new page request, step S509 follows and the spooler 302 prepares for writing the intermediate code into the page description file.

In step S510, in order to store the print request into the spool file 303, the spooler 302 converts the DDI function of the print request into the intermediate code. In step S511, the spooler 302 writes the print request (intermediate code) converted in the storable form in step S510 into the page description file of the spool file 303. After that, the processing routine is returned to step S501 and the spooler 302 again receives the print request from the application. The series of processes in steps S501 to S511 are continued until the job end request (End Doc) is received from the application. At the same time, the spooler 302 obtains the information of the print modification setting and the like stored in the DEVMODE structure from the printer driver 203 and stores it as a job setting file into the spool file 303. If it is decided in step S506 that the print request from the application is the job end request, since the processes of all of the print requests from the application have been finished, step S512 follows. The spooler notifies the spool file manager 304 of the print job status and the processes are finished.

Figure 6:
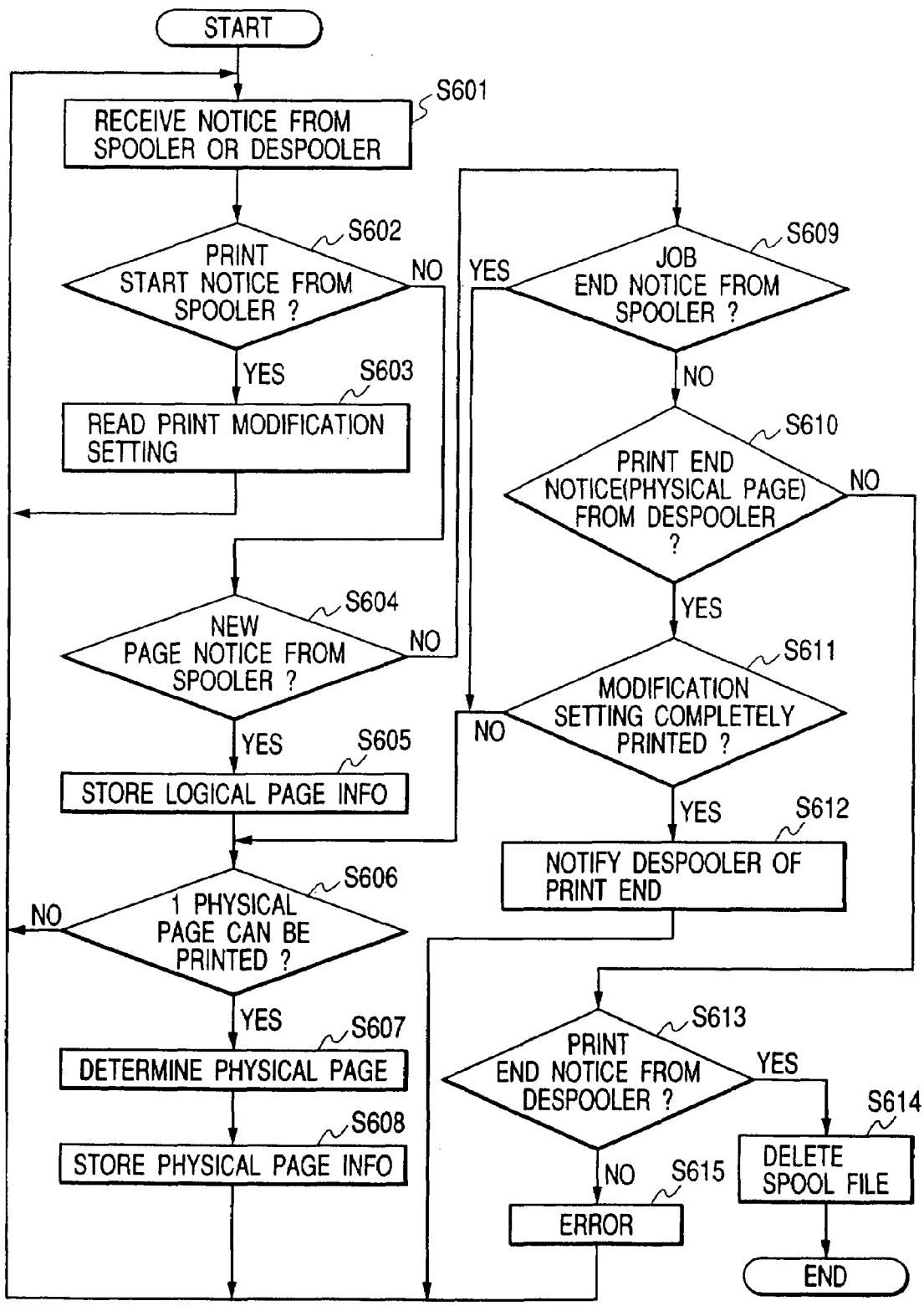
FIG. 6 is a flowchart showing a print control in a spool file manager 304.

FIG. 6 is a flowchart showing the details of a control, in the spool file manager 304, which is executed between the generating process of the spool file 303 and a forming process of the print data, which will be explained hereinlater.

In step S601, the spool file manager 304 receives the print job status notice from the spooler 302 or despooler 305.

In step S602, the spool file manager 304 discriminates whether the print job status notice indicates a print start notice from the spooler 302 which is notified in step S504 or not. If YES, step S603 follows. The print modification setting is read out from the spool file 303 and the management of the jobs is started. If it is decided in step S602 that the print job status notice does not indicate the print start notice from the spooler 302, step S604 follows. The spool file manager 304 discriminates whether the print job status notice indicates a print end notice of one logical page from the spooler 302 which is notified in step S508 or not. If it is determined that the print job status indicates the print end notice of one logical page, step S605 follows. Logical page information corresponding to the logical page is stored. Subsequently, in step S606, whether the printing of one physical page can be started at this time point for (n) logical pages after completion of the spooling or not is discriminated. If it can be printed, step S607 follows and the physical page number is determined on the basis of the number of logical pages which are allocated to one physical page to be printed.

With respect to the calculation of the physical page, for example, in case of the print modification setting such that four logical pages are arranged to one physical page, at a point when the fourth logical page has been spooled, the first physical page is formed and becomes printable. Subsequently, the second physical page is formed and becomes printable at a point when the eighth logical page has been spooled.

Even if the total number of logical pages is not equal to a multiple of the number of logical pages which are arranged to one physical page, the logical pages which are arranged to one physical page can be determined by the spool end notice in step S512.

In step S608, the numbers of the logical pages constructing the physical page which can be printed and the information such as a number of the physical page and the like are preserved in the job output setting file (file including the physical page information) in a format as shown in FIG. 10, and the despooler 305 is notified of the fact that the physical page information of the amount of one physical page was added. After that, the processing routine is returned to step S601 and the spool file manager 304 waits for the next notice. In the embodiment, the printing process can be performed even if the spooling of all of the print jobs is not finished yet at a point when one page of the print data, namely, the logical pages constructing one physical page have been spooled.

If it is determined in step S604 that the status notice is not the print end notice of one logical page from the spooler 302, step S609 follows. The spool file manager 304 discriminates whether the status notice is the job end notice from the spooler 302 which is notified in step S512 or not. If it indicates the job end notice, step S606 follows. If it is not the job end notice, step S610 follows. The spool file manager 304 discriminates whether the received notice is the print end notice of one physical page from the despooler 305 or not. If it is the print end notice of one physical page, step S611 follows and whether all of the processing of the print modification setting have been finished or not is discriminated. If YES, step S612 follows and the end of the printing is notified to the despooler 305. If it is determined that the printing for the print modification setting is not finished yet, the processing routine advances to foregoing step S606. The despooler 305 in the embodiment presumes the number of one physical page as a unit of performing the printing process. In step S608, the information necessary for performing the printing process of one physical page is successively preserved in the file and converted into a format such that it can be used again. However, if there is no need to use again, it is also possible to use an installing format such that a high speed medium such as a sharing memory or the like is used and the information is successively overwritten on a unit basis of one physical page and the processing speed and resources are saved. In the case where the status of the spool is earlier than that of the despool or where the despool is started after the end of the spool of all pages, it is possible to construct in such a manner that the fact that the page can be printed is not notified every physical page in step S608 but the contents indicative of the fact that a plurality of physical pages or all of the physical pages can be printed is notified in accordance with the status on the despool side, thereby saving the number of notifying times.

If it is determined in step S610 that the received notice is not the print end notice of one physical page from the despooler 305, step S613 follows. The spool file manager 304 discriminates whether it is the print end notice from the despooler 305 or not. If it is decided that the notice is the print end notice from the despooler 305, step S614 follows. The spool file manager 304 deletes the corresponding page description file in the spool file 303 and finishes the processes. If the notice is not the print end notice from the despooler 305, step S615 follows. The spool file manager 304 executes the other ordinary process and waits for the next notice.

Figure 7:
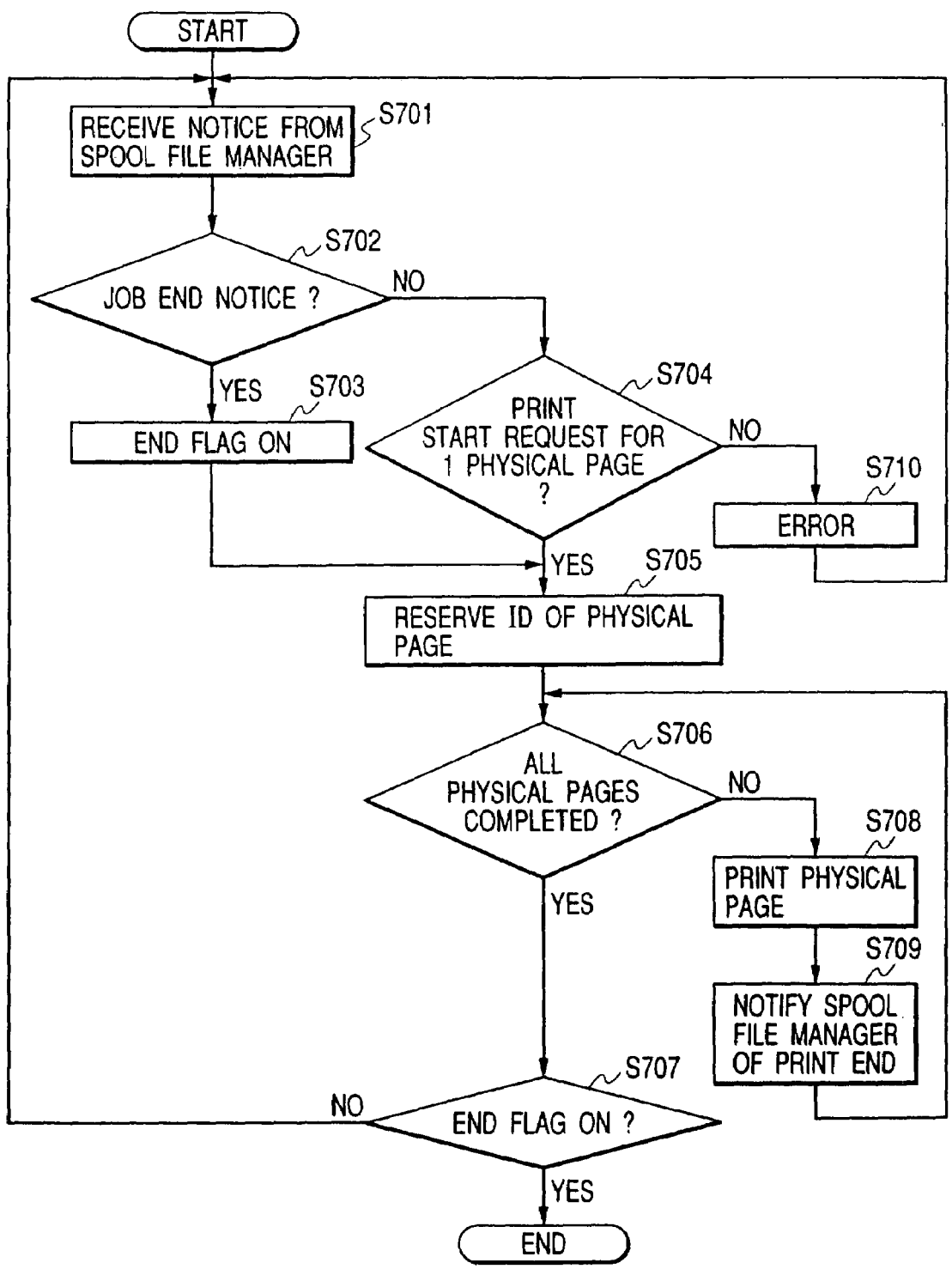
FIG. 7 is a flowchart showing processes in a despooler 305.

FIG. 7 is a flowchart showing the details of the forming process of the print data in the despooler 305.

In response to the print request from the spool file manager 304, the despooler 305 reads out the necessary information (page description file and job setting file) from the spool file 303 and forms print data. A method of transferring the formed print data to the printer is as described in FIG. 3.

In the formation of the print data, first, in step S701, the foregoing notice from the spool file manager 304 is inputted.

In step S702, the despooler 305 discriminates whether the inputted notice is the job end notice or not. If it is the job end notice, step S703 follows and the end flag is turned on. Step S705 follows. If it is not the job end notice in step S702, step S704 follows and whether the print start request of one physical page has been notified or not is discriminated. If it is determined in step S704 that the inputted notice is not the print start request, step S710 follows and other error processes are executed. The processing routine is returned to step S701 and the despooler 305 waits for the next notice. If it is determined in step S704 that the inputted notice is the print start request of one physical page, step S705 follows. The despooler 305 preserves the ID of the physical page which received the notice in step S704 and can be printed. In step S706, the despooler 305 discriminates whether the printing process has been finished with respect to all pages of the physical page IDs preserved in step S705 or not. If the process has been finished with respect to all of the physical pages, step S707 follows. Whether the end flag has been turned on in step S703 or not is discriminated. If the end flag has been turned on, it is regarded that the printing of the job was finished. The spool file manager 304 is notified of the fact that the process of the despooler 305 has been finished. The processes are finished. If it is decided in step S707 that the end flag is OFF, the processing routine is returned to step S701 and the despooler 305 waits for the next notice. If it is determined in step S706 that the printable physical pages still remain, step S708 follows. The despooler 305 sequentially reads out the IDs of the physical pages which are not processed from the preserved physical page IDs, reads the information necessary to form the print data of the physical pages corresponding to the read-out physical page IDs, and executes the printing process. In the printing process, the print request command stored in the spool file 303 is converted into the format (GDI function) which can be recognized by the graphic engine 202 in the despooler 305 and transferred. With respect to the print modification setting (hereinafter, referred to as an N-page print) such that a plurality of logical pages are arranged in one physical page as in the embodiment, the print request command is converted in consideration of the reduced arrangement in this processing step. If the necessary printing process is finished, in step S709, the spool file manager 304 is notified of the end of the formation of the print data of one physical page. The processing routine is returned to step S706 again. The processes are repeated until the printing process is performed with regard to all of the IDs (which have been preserved in step S705) of the printable physical pages.

The above flow relates to the printing process using the dispatcher 301, spooler 302, spool file manager 304, and despooler 305. By processing as mentioned above, the application 201 is released from the printing process at the timing when the spooler 302 forms the intermediate code and stores it into the spool file 303, so that the process can be finished in a shorter time than the time that is required when the drawing function is directly outputted to the printer driver 203. Since the data is temporarily preserved in the spool file 303 as an intermediate file (page description file, job setting file (spool description file)) in consideration of the print setting of the printer driver, the user can be allowed to recognize the print preview to be actually printed and the print jobs formed by a plurality of applications can be composed and rearranged. Even in case of changing the print setting, it is possible to allow the user to perform such a change without again starting up the application and printing.

In the printing process using the spooler 302, the job output setting file is generated when the print request is issued from the despooler 305 to the graphic engine 202. However, the job output setting file is also generated when the preview, job composing, or the like is performed. In case of the single job, the job output setting file is equivalent to the job setting file. In case of the composed job, the job output setting file is generated on the basis of a plurality of job setting information. The job output setting file will now be described.

FIG. 10 shows an example of the job output setting file in which the information constructing the printable physical pages which are generated by the spool file manager 304 has been preserved in step S608. A field 1001 relates to the ID for identifying the job and it can be also held in a form of a name of a file which preserves the information or a name of a sharing memory. A field 1002 relates to the job setting information. The job setting information includes information such that only one item can be set for one job, such as structure necessary to start the printing of the job for the graphic engine 202, designation of the N-page print, designation of an additional drawing of a page frame or the like, the number of copies, finishing designation such as stapling or the like, or the like. Information of a necessary amount is preserved in accordance with the function for the job is preserved in the job setting information 1002. A field 1003 relates to the number of physical pages of the job and indicates that the physical page information as much as the number of physical pages has been preserved after this field. Since the embodiment uses the system such that the number of printable physical pages is notified, the apparatus can operate even if this field is omitted. After this field, the physical page information of the number stored in the field 1003 is stored in a field 1004 and subsequent fields. The physical page information will be described with reference to FIG. 12.

FIG. 11 shows an example of the job setting information shown in the field 1002 in FIG. 10. A field 1101 relates to the number of entire physical pages. A field 1102 denotes the number of entire logical pages. The fields 1101 and 1102 are used in the case where the number of pages or the like is printed as additional information by adding them to the print data, or the like. When the printing operation continues, temporary values are preserved in both fields 1101 and 1102 if the number of pages is added. On the other hand, if the number of pages is not added, no values are preserved in those fields since the spool file manager 304 prolongs the formation of the information of the printable physical pages until the printing is finished. A field 1103 relates to the number of copies information for designating the number of copies of the print job. A field 1104 relates to a designation about whether the printing is performed copy by copy in the case where the a mode to print a plurality of copies is set in the field 1103. A field 1105 relates to finishing information such as stapling, punch, Z-fold, or the like and is designated in the case where there is a finisher in the printer main body or the outside. A field 1106 relates to additional print information. Information which is added to the job, namely, decoration such as a page frame or the like, additional information such as a date or the like, a user name, the number of pages, watermark print, or the like is preserved. As the number of functions increases, the number of fields which are included in the job setting information increases. For example, if the duplex printing can be performed, a field to preserve the designation of the duplex printing is added.

FIG. 12 shows an example of the physical page information shown in the field 1004 in FIG. 10. A first field 1201 relates to a physical page number and a value which is used when the printing order is managed or the physical page number is added and printed. A field 1202 relates to physical page setting information. In the case where a layout or a designation of color/monochrome can be performed every physical page, the setting of the layout or color/monochrome is preserved. A field 1203 relates to the number of logical pages which are allocated to the physical page. In case of allocating four logical pages to one physical page, an ID showing "4" or a 4-page printing is preserved. Information of the logical pages as many as the number designated in the field 1203 is preserved in a field 1204 and subsequent fields. There is a case where the number of actual page data is smaller than the number of pages designated in the field 1203 in dependence on the number of pages printed from the application 201. In such a case, special data indicative of empty pages is preserved in the logical page information, thereby coping with such a case.

FIG. 13 shows an example of the physical page setting information in 1202. A field 1301 relates to an arranging order of the logical pages onto the physical page. The designation of the order (from the upper left to the right, from the upper left to the down, etc.) of arranging the logical pages onto the physical page in the N-page printing mode has been preserved. The field 1301 may not relate to the arranging order in some systems. For example, there is also a case of substituting the setting in 1301 by setting the order of the logical page information in the field 1204 and subsequent fields in order according to the arranging order instead of the order of the page numbers. A field 1302 relates to information of the obverse/reverse side in the duplex printing mode and is used when, for example, binding margins on the obverse and reverse sides are aligned. A field 1303 relates to a designation of a color page or a monochrome page. If the printer has a monochrome mode and a color mode, in a document in which a color page and a monochrome page exist mixedly, a value in the field 1303 is used in the case where the user wants to print the color page in the color mode and print the monochrome page in the monochrome mode, or the like. By having such information, the process can be changed page by page in the color printer by setting the printing mode to an automatic color mode. That is, the color page can be transferred and controlled by rotating the intermediate transfer member (intermediate transfer drum, intermediate transfer belt) or transfer member (transfer drum, transfer belt) by the number of times corresponding to the number of device colors, for example, four times in case of YMCK. The monochrome page can be transferred and controlled by rotating it once only with respect to black. A field 1304 relates to additional print information and is used in the case where additional information such as the number of pages, date, and the like is printed to the physical page. Fields are added also to the physical page setting information in accordance with the functions of the system.

FIG. 14 shows an example of the logical page information shown in 1204. A field 1401 relates to an ID of the logical page. The intermediate code in the page description file corresponding to the logical page is referred to from the spool file 303 by using this ID. It is sufficient that it is possible to access to the intermediate code of the logical page by using this ID. A file or a memory pointer can be used or the intermediate code itself constructing the logical page can be also inserted. A field 1402 relates to a logical page number and is used in case of printing the logical page number as additional information or used for auxiliary information of the logical page ID. Various setting items which can be designated on a logical page unit basis are preserved in format information in a field 1403. For example, additional print information such as a page frame and the like and information of various settings such as an enlargement (magnification/reduction ratio) and the like which are designated on a logical page unit basis are preserved. If necessary, attribute information such as color/ monochrome information of the logical page unit and the like for the logical page can be also preserved. On the contrary, the field 1403 is unnecessary in a system such that it is unnecessary to switch the settings on a logical page unit basis or the attribute information of the logical page unit is unnecessary.

The job output setting file is constructed as mentioned above. The job setting file is also similarly constructed and has the following items as jobs: a print style (single, duplex, binding print); a print layout (Nup, poster print); additional information (addition of a watermark, a date, and a user name); the number of copies; and paper size information. It is constructed by the arranging order of the logical pages, obverse/reverse side in the duplex printing, color mode, and the like every physical page.

Further, FIG. 3 shows an example in which the editor 307 having the setting changing function of the job is arranged in addition to the expanding system described above. In the embodiment, as for the setting contents of the job, since the single job is included in the job setting file, the composed job is included in the job output setting file shown in FIG. 10, and they are independent of the spool file 303 in which the intermediate codes have been preserved, the setting of the job can be changed by remaking the job output setting file. The editor 307 remakes the job output setting file or rewrites a part thereof solely or in cooperation with the spool file manager 304, thereby realizing the setting changing function of the job.

Figure 15:
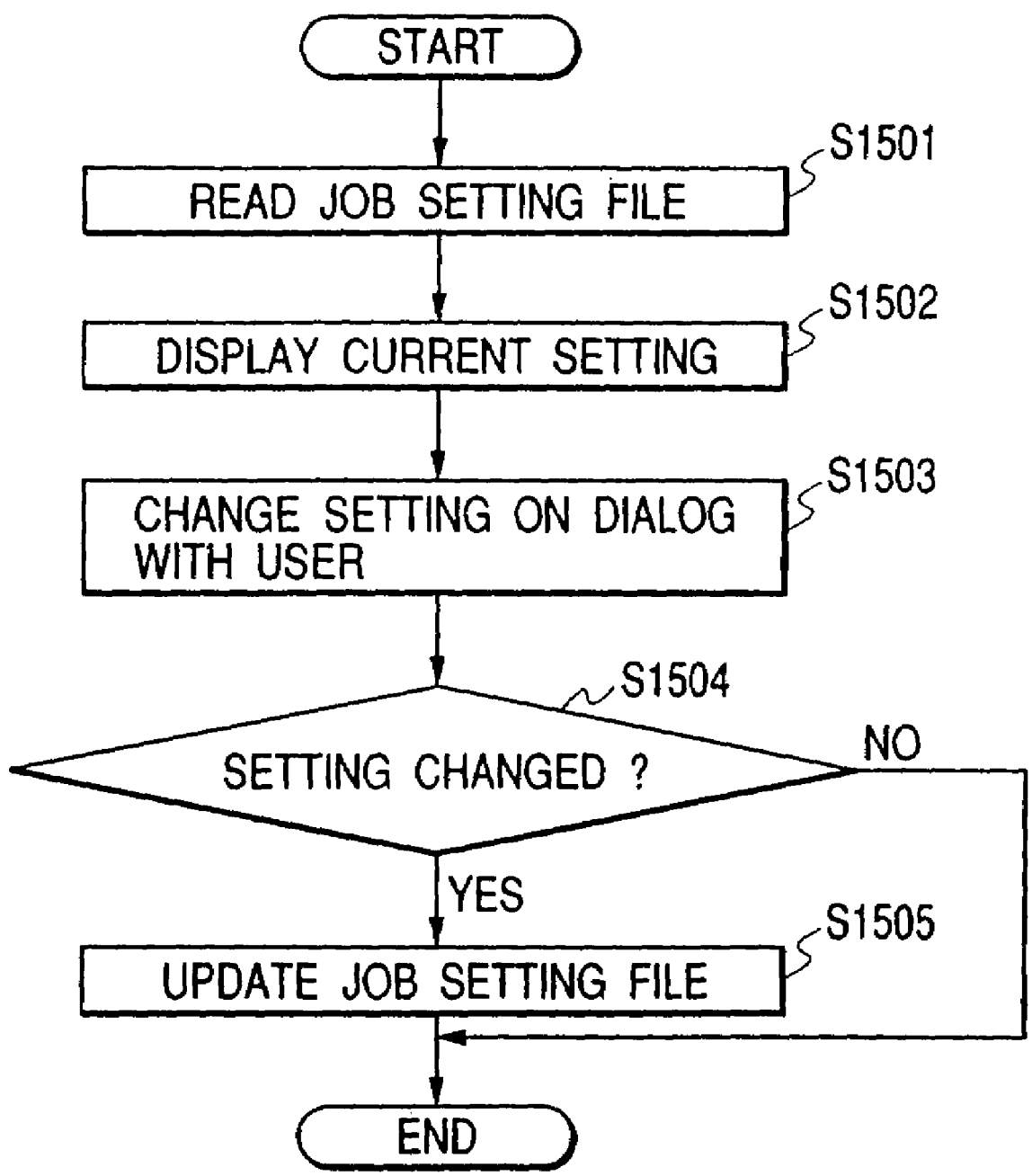
FIG. 15 is a flowchart showing a setting changing processing in a setting change editor 307.

FIG. 15 is a flowchart showing the details of the job setting changing process in the editor 307.

First, in step S1501, the editor reads the job setting file or job output setting file. The job output setting file is the same file as the file which is read by the previewer 306 or despooler 305. In step S1502, the read result is displayed to the user. In step S1503, an interactive operation with the user is performed on the user interface as shown in FIG. 18 and the setting contents are changed by the designation of the menu or the like mentioned above. This step is not limited to the interactive style but can be executed by a batch style such that the setting contents are changed in accordance with the contents of the setting change written in a file or the like. In step S1504, the editor discriminates whether there is a change between the contents which were first read out in step S1501 and the current designated setting contents or not. If the setting contents were changed, step S1505 follows. A new job output setting file is generated, the spool file manager is notified of the fact that there is a change, and the processing routine is finished. If it is determined in step S1505 that there is no change, the spool file manager is notified of the fact that there is no change, and the processing routine is finished. The new job output setting file is generated as mentioned above. The new job output setting file is validated and the old job output setting file is deleted by selecting an "OK" button on the picture plane of FIG. 18. In case of the job setting file of the single job instead of the change from the job output setting file, it is not deleted but preserved. If a "RETURN TO INITIAL STATE" button is selected on the user interface picture plane of FIG. 18, the new job output setting file is deleted and the old job output setting file is validated and reflected to the display. Although the embodiment has been described on the assumption that the editor 307 is a separate module, it can be also constructed merely as a part of the user interface of the spool file manager 304. It is also possible to use an installing style such that in the editor 307, the change contents are not actually written in the job output setting file but only the contents of the setting change are notified to the spool file manager 304, and the actual change of the job output setting file is performed on the spool file manager 304 side.

Although the expanding system in which a plurality of print jobs are further composed and printed as one print job is shown in FIG. 3, an explanation will be made with respect to the expansion for despooling and previewing the composed job.

Usually, the job setting file as a spool file 303 in the intermediate format is generated on a job unit basis. In case of the single job, since the intermediate codes of the logical pages in the processing target job file are sequentially read out and processed, the logical page ID in the field 1401 can be realized by a relative or absolute offset indicative of the position in the file where each logical page exists. In case of the composed job, it is necessary to specify the spool file and the page information belonging to the job from the job ID in the field 1401. The embodiment uses a system of specifying the spool file by adding the ID for identifying the spool file to the logical page ID. In this case, a main change point is only the field 1401. This is because if the spool file can be identified, the reading operation of the page portion can be processed by the same logic as that of the process for the single job. If the spool file has been preserved in a form of another file every logical page, there is also an installing form such that the file name of the logical page is set to the logical page ID in the field 1401 as it is.

An embodiment of the invention in the foregoing print system will now be described.

According to the foregoing print system, a plurality of documents whose printing has been executed from an arbitrary application can be printed as one job. Thus, a plurality of documents can be collectively N-page printed, stapled, can be outputted as a layout of a binding printing (namely, in the case where they are folded at the center, the page order is replaced and two pages are printed on both sides so as to form a style of a book), or the like. An effective output result which is not obtained in case of printing the documents one by one can be obtained.

Figure 19:
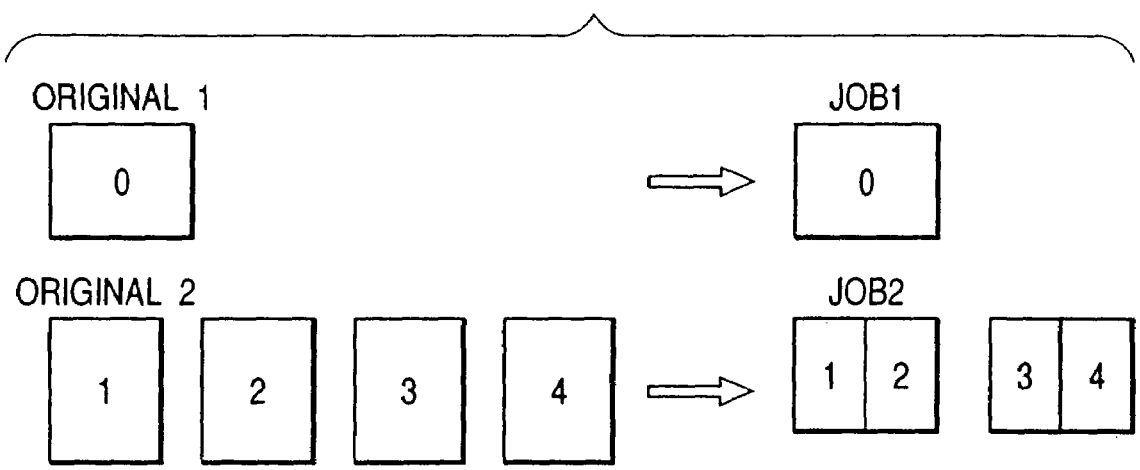
FIG. 19 is a diagram for explaining a designation of a layout for originals.

FIG. 19 shows such an example. A job 1 is a job which designates the 1-page printing in the setting of the layout for an original 1 (1 page of A4 landscape). A job 2 is a job which designates the 2-page printing in the setting of the layout for an original 2 (4 pages of A4 portrait). The setting of the layout can be designated by the setting of the page layout of the UI (user interface) of the printer driver shown in FIG. 9 when documents are printed.

Figure 20:
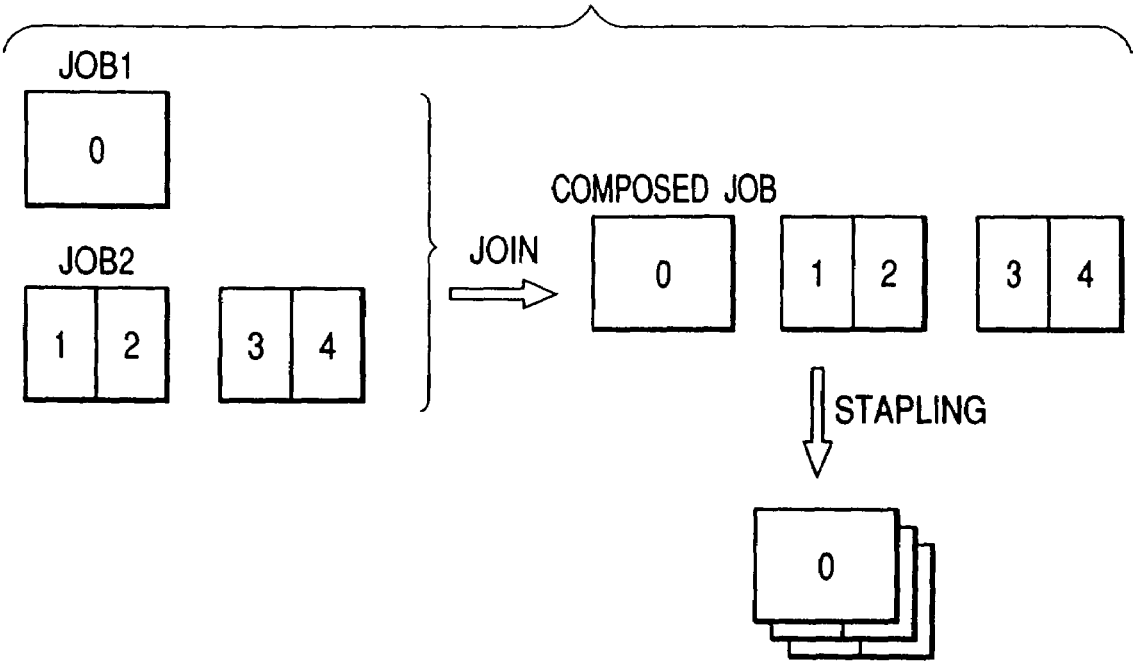
FIG. 20 is a diagram for explaining a joint of jobs of different layouts.
Figure 21A:
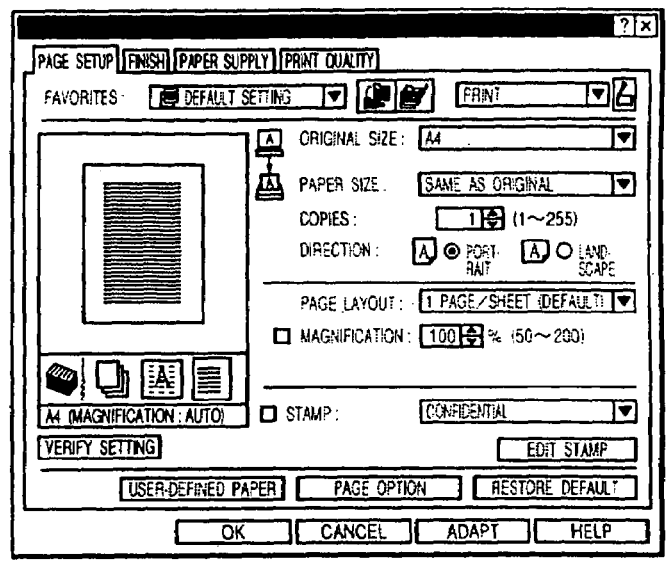
FIGS. 21A, 21B, and 21C are diagrams for explaining a UI of a printer driver in which a setting change of a layout is inhibited.
Figure 21B:
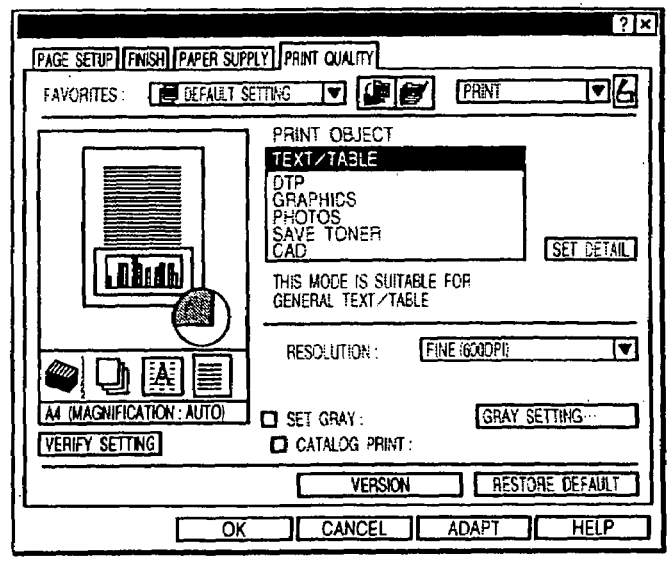
Figure 21C:
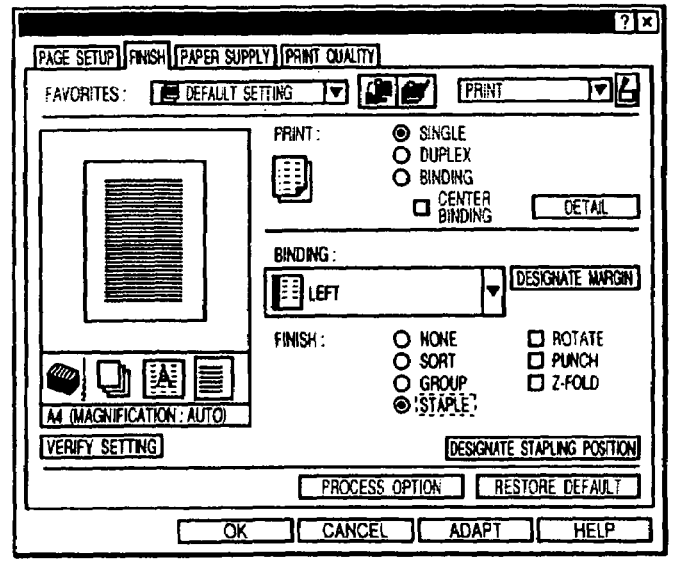

As shown in FIG. 20, if two jobs are composed while the layout setting of each job is validated, all of them are outputted to a physical paper of A4 landscape, so that a print result suitable for a finishing process such as stapling or the like is obtained. In this instance, a small preview of the editing picture plane (FIG. 18) of the composed print job becomes a composed job as shown in FIG. 20. Both "PAGE LAYOUT" and "SET JOB BOUNDARY" are set into a gray-out display in a state where "UNIFY LAYOUT" in FIG. 18 is not checked, so that they cannot be selected. A "SET DETAIL" button is valid and the print setting can be changed by using the UI of the printer driver. In case of performing the setting of finishing by using the UI of the printer driver while the layout setting of each job is valid, if the UI in FIG. 9 is used, the setting for the page layout is performed to the job obtained after composing, so that the settings of the page layouts are unified. In the invention, therefore, as shown in FIGS. 21A and 21B, if the UI of the printer driver is used under such conditions, the print setting regarding mainly the layout including the page layout and the print setting regarding the print quality are limited to an unchangeable state (namely, they are set to the unselectable state by setting a gray-out display) and a control is made so that the print setting regarding the finishing is displayed on the display unit in a changeable state as shown in FIG. 21C.

FIG. 22 is a flowchart showing processes in the UI of the printer driver. Two jobs of job 1 and job 2 have been stored in the window of the spool file manager 304 shown in FIG. 16. The editor 307 shown in FIG. 18 is activated to compose the two jobs. As shown in FIG. 18, the setting of stapling can be also designated in this window. However, to perform the detail setting of the stapling position or other finishing setting, it is necessary to press the "SET DETAIL" button, activate the UI of the printer driver, and set there. When the "SET DETAIL" button is pressed, the processes of FIG. 22 are started.

In step S2201, the UI of the printer driver obtains the print setting information (DEVMODE) from the editor 307. The setting contents of all items which are set by the UI of the printer driver shown in FIG. 9. The spooler 302 preserves the print setting information as job setting information in the spool file 303 every job. When "SET DETAIL" is instructed in a state where the logical page of job 1 is selected in the small preview in FIG. 18, the editor 307 reads out the print setting information of job 1 from the spool file 303 and provides it to the UI of the printer driver. Similarly, when "SET DETAIL" is instructed in a state where the logical page of job 2 is selected in the small preview, the editor 307 reads out the print setting information of job 2 from the spool file 303 and provides it to the UI of the printer driver.

In step S2202, the items whose setting change is limited are obtained. Although all of the items to be limited can be also designated from the editor 307 with respect to each setting of the UI, according to the print system, the limit information is designated by parameters shown in FIG. 23 in order to enable the print system to operate even by a printer driver having a different UI. Those limit items can be limited in combination by expressing each item by one bit.

Since no limitation is particularly provided for the UI when each original shown in FIG. 19 is printed, the print setting change-limited information is set to 0. On the other hand, the print setting change-limited information is set to 1 when the "SET DETAIL" button is pressed in order to designate the stapling for the job obtained after composing as shown in FIG. 20. As for the setting regarding the print quality, there is a case where it is unpreferable to change it for the job which has once been converted into the intermediate code. In case of FIG. 20, therefore, there is also a case where flags of 1 and 2 are set and the print setting change-limited information is set to 3.

In step S2203, the UI is displayed on the basis of the print setting information received from the editor 307, the UI items to be limited corresponding to the print setting change-limited information are read out from its own information data per apparatus kind (not shown) and the corresponding items of the displayed UI are set to the unchangeable state by setting the gray-out display. When flag 1 is set, as shown in FIG. 21A, the setting items regarding the layout are set into the unchangeable state by setting a gray-out display. When flag 2 is set, as shown in FIG. 21B, the setting items regarding the print quality are similarly set into the unchangeable state. Since the setting items regarding the finishing can be changed as shown in FIG. 21C, the stapling or the like can be set.

In step S2204, the print setting information received from the editor 307 is updated in accordance with the contents of the change performed by the user to the UI, and the editor 307 obtains this result. The editor 307 updates the preview picture plane by the foregoing method on the basis of the updated print setting information. However, with respect to the setting regarding the layout, as a setting regarding each job, by applying the setting contents read out from the physical page information of the job output setting files shown in FIGS. 10 to 12, the print setting information can be changed without changing the layout attributes of each job.

Figures 24, 25:
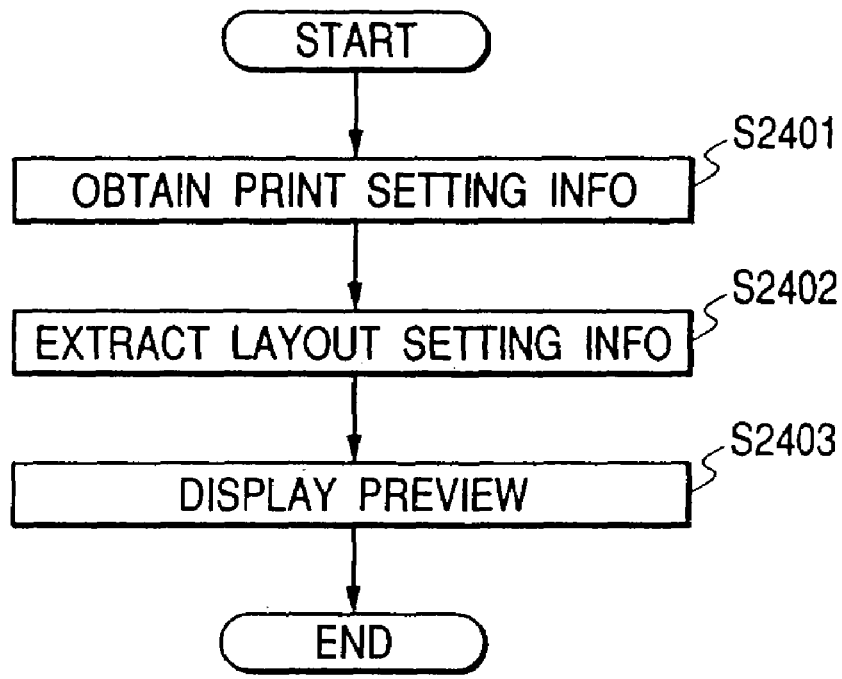
FIG. 24 is a flowchart for explaining a process for allowing the changed layout information to reflect to a preview.
FIG. 25 shows an example of an interface for extracting layout setting information from the print setting information.

FIG. 24 shows a flowchart for the information obtaining process for changing the preview from the print setting information.

In step S2401, the editor 307 obtains the print setting information updated by the UI of the printer driver in step S2204. In step S2402, the layout setting information (information of the setting to be reflected to the preview) is extracted from the received print setting information. There are two kinds of information to be extracted. One is information regarding the layout process (hereinafter, referred to as a layout process on the host side) which is executed by the spool file manager 304 by using the despooler 305 and the other is information regarding the layout process (hereinafter, referred to as a layout process on the printer side) which is executed by the printing apparatus side such as a printer. For example, in the layout of "2 PAGES/SHEET" (2up), there are: a layout process on the host side in which two reduced logical pages of A5 portrait are arranged to an output paper of A4 landscape; and a layout process on the printer side in which two logical pages of A4 portrait and a direct size (equal magnification) are arranged to an output paper of A3 landscape. Which Nup mode is used has been determined for each layout process by the setting according to the property of the printer driver. At present, only the layout process on the host side copes with the layout process of a page layout of 9 pages/sheet or a poster printing (2×2, 3×3, etc.). Although a method of directly referring to the contents of the print setting information can be also used to extract the layout setting information, in order to enable the print system to operate even by a printer driver having the print setting information in a different format, such a purpose can be realized by a method whereby an interface to extract the layout setting information from the print setting information is prepared on the printer driver side without directly referring to the contents of the print setting information. FIG. 25 shows an example of such an interface. The editor 307 sets the information to be obtained into iMode by a flag (in this case, 3 is designated because the information of both of the host and the printer is obtained), "pDevMode" as a pointer to the print setting information including the layout setting information is set, and a GetLayoutInfo function which is provided by the printer driver is called. The printer driver writes the information designated by iMode into a memory area designated by pInfo. The editor 307 can obtain the layout setting information by referring to the contents in the buffer designated by pInfo. The editor 307 updates the physical page information or the like shown in FIGS. 10 to 12 on the basis of the information regarding the layout process on the host side obtained here. If the information regarding the layout process on the printer side obtained here exists, a data area of the same structure as that of the physical page information shown in FIGS. 10 to 12 is prepared for preview. A result obtained by further performing the layout process on the printer side to the physical page information after completion of the layout process on the host side is stored in the prepared data area.

The preview based on the two kinds of layout setting information is performed in step S2403.

When only the layout process on the host side is designated, in a manner similar to the case where the spool file manager 304 executes the layout process by using the despooler 305 through the physical page information shown in FIGS. 10 to 12 upon printing, the previewer 306 or editor 307 executes process similar to that mentioned above to the picture plane, so that the preview of the layout process on the host side can be executed. When the layout process on the printer side is executed, by similarly performing the preview on the basis of the physical page information file for preview, the preview to which the layout processes on both of the host side and the printer side are reflected can be displayed on the picture plane.

The invention can be applied to a system comprising a plurality of equipment (for example, a host computer, interface equipment, a reader, a printer, and the like) or to an apparatus (a copying apparatus, a printer, a facsimile apparatus, or the like) comprising one equipment.

The objects of the invention can be also accomplished by a method whereby a storage medium in which program codes of software to realize the functions of the embodiments mentioned above have been stored is supplied to a computer (or a CPU or an MPU) of a system or an apparatus, and the computer reads out the program codes stored in the storage medium and executes them.

In this case, the program codes themselves read out from the storage medium realize the functions of the embodiments mentioned above and the storage medium in which the program codes have been stored constructs the invention.

As a storage medium to supply the program codes, for example, a floppy disk, a hard disk, an optical disk, a magnetooptic disk, a CD-ROM, a CD-R, a magnetic tape, a non-volatile memory card, a DVD, an MO, an ROM, or the like can be used.

The invention incorporates not only a case where the computer executes the read-out program codes, so that the functions of the embodiments mentioned above are realized but also a case where an OS (operating system) or the like which operates on a computer executes a part or all of the actual processes on the basis of instructions of the program codes and the functions of the embodiments mentioned above are realized by the processes.

The invention further incorporates a case where the program codes read out from the storage medium are written in a memory equipped for a function expanding board inserted in a computer or a function expanding unit connected to a computer and, thereafter, a CPU or the like equipped for the function expanding board or function expanding unit executes a part or all of the actual processes on the basis of instructions of the program codes, and the functions of the embodiments mentioned above are realized by the processes.

The objects of the invention is also accomplished by a method whereby program codes of software to realize the functions of the embodiments mentioned above are installed in a computer (or a CPU or an MPU) of a system or an apparatus, and the computer reads out the installed program codes and executes them.

In this case, the program codes themselves which were downloaded and installed by a download service or the like of the Internet realize the functions of the embodiments mentioned above and the program codes themselves construct the invention. That is, Claims of the present invention also incorporate a computer program itself to realize the functions and processes of the invention.

The supplying method of the computer program is not limited to the case where it is stored in an FD or a CD-ROM and a computer is allowed to read out it and install it therein but the computer program can be also supplied by a method whereby the computer is connected to a homepage of the Internet by using a browser of a client computer and the computer program itself of the invention or a compressed file including an automatic installing function is downloaded from the homepage. The supplying method can be also realized by a method whereby the program codes constructing the program of the invention are divided into a plurality of files and each file is downloaded from different homepages. That is, a WWW server for allowing a plurality of users to download the program file for realizing the functions and processes of the invention by the computer is also incorporated in Claims of the invention.

The supplying method of the computer program can be also realized by a method whereby the program of the invention is enciphered and stored in the storage medium such as an FD or the like and distributed to the users, the user who cleared predetermined conditions are allowed to download key information for decrypting the encryption from a homepage through the Internet, the enciphered program is executed by using the key information and installed to the computer.

As mentioned above, the invention has an effect such that the print setting for the composed job can be changed while validating the print setting attributes designated every job.

The print setting changing method, apparatus, and medium for the jobs according to the invention have an effect such that the setting change of the layout can be limited.

The print setting changing method, apparatus, and medium for the jobs according to the invention have an effect such that the setting change of the print quality can be limited.

As described above, according to the invention, there is provided the information processing apparatus for forming print data to be transmitted to the printing apparatus, comprising: an intermediate data converter for converting data formed by an application to be printed into data in an intermediate code format and temporarily preserving the intermediate code format data as one print job in a memory; a job composer for forming one composed job by composing a plurality of print jobs preserved by the intermediate data converter; and a preview display controller for obtaining layout information from the intermediate code format data preserved by the intermediate data converter and controlling display of a preview of the composed job on the basis of the layout information. Therefore, the print jobs can be composed after they were outputted from the application and the preview display can be performed in consideration of the layout information of each print job included in the composed job.

The information processing apparatus further comprises the setting editor for displaying a user interface to edit a print setting of the preserved intermediate code format data and temporarily preserving the print setting edited by the user interface in association with the intermediate code format data, wherein the layout information is included in the print setting. Therefore, the edition of the print setting of the jobs after they were outputted from the application can be performed.

Since the user interface can edit the print setting for the composed job, the edition of the print setting can be performed even for the composed job which could not be performed hitherto.

The print settings have temporarily been preserved on a print job unit basis and in case of the composed job, since the file for the print setting is newly generated for the composed job, the print setting remains even for each job as a composing target of the composed job. Even in the case where the composed job is separated, the preview in the print setting of the single job can be performed.

Since the layout information includes the layout process in the information processing apparatus and the layout process in the printing apparatus, the preview display can be performed in consideration of the layout processes in both of the host and the printer.

The information processing apparatus further has the job composer for forming one composed job by composing print jobs of the plurality of data obtained by converting the data to be printed into the intermediate code format data and temporarily preserved in the spooler, and the user interface can edit the print setting for the composed job. Therefore, even in case of forming one print job by composing the print jobs which were temporarily preserved, the user interface which enables the edition of the print setting of the composed job which cannot be performed hitherto can be presented to the user.

The information processing apparatus further has the limit information obtaining unit for obtaining the limit information of the print setting, and the display controller limits the print setting which can be edited in the user interface on the basis of the limit information. Therefore, the limit information can be changed every print job and a degree of freedom of the changing operation of the print setting after the spooling increases.

The information processing apparatus further has the print data forming unit for forming the print data to be transmitted to the printing apparatus on the basis of the data in the intermediate data format which has temporarily been preserved by the spooler. Therefore, even when the print setting is changed, the print data can be formed without instructing again the printing from the application.

The information processing apparatus further has the draw command forming unit for converting the intermediate data format data temporarily preserved by the spooler into a draw command which can be interpreted by a drawing unit of an OS and outputting; and the print command allocating unit for sending the print command received from the application through the drawing unit of the OS to the spooler and sending the print command received from the draw command forming unit through the drawing unit of the OS to the print data forming unit. Therefore, the application can be released early from the output process at the time of the print instruction and the print data is printed through the drawing unit of the OS after completion of the edition. Therefore, effects such that the print data forming unit and the special interface at the time of outputting the edited data are unnecessary, the print data forming unit similar to the conventional one can be used, and the developing step is lightened are obtained.

Since the draw command is the GDI function, the print command is the DDI function, and the print data is the printer language, they can be used by the OS which is used as a standard system.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus as a host computer for generating print data to be transmitted to a printing apparatus, comprising:
    a setting unit configured to set first and second print setting information for first and second print data, respectively, to be transmitted to the printing apparatus, the first and second print setting information including first and second layout information, respectively;
    a composing unit configured to form composed print data by composing the first and second print data for which the first and second print setting information, respectively, have been set by the setting unit; and
    a display control unit configured to display, for the composed print data formed by the composing unit, an image of the first print data based on the first layout information included in the first setting information and an image of the second print data based on the second layout information included in the second setting information, wherein if the setting unit sets new print setting information for the composed print data, the display control unit displays an image of the composed print data with a unified layout based on new layout information included in the new print setting information.

2. An information processing apparatus according to claim 1, further comprising a spooler unit configured to convert drawing data issued by an application to be printed into intermediate code format data different from the print data and to temporarily spool the intermediate code format data and the print setting information as one print job in a spool file.

3. An information processing apparatus according to claim 1, wherein the first layout information, the second layout information and the new layout information each indicates the number of pages arranged on one print sheet.

4. An information processing method for generating print data to be transmitted to a printing apparatus, comprising the steps of:
    setting first and second print setting information for first and second print data, respectively, to be transmitted to the printing apparatus, the first and second print setting information including first and second layout information, respectively;
    forming composed print data by composing the first and second print data for which the first and second print setting information, respectively, have been set in the setting step; and
    displaying composed print data formed in the composing step, an image of the first print data based on the first layout information included in the first setting information and an image of the second print data based on the second layout information included in the second setting information, wherein if the setting step sets new print setting information for the composed print data, the display step displays an image of the composed print data with a unified layout based on new layout information included in the new print setting information.

5. An information processing method according to claim 4, further comprising the step of converting drawing data issued by an application to be printed into intermediate code format data different from the print data and temporarily spooling the intermediate code format data and the print setting information as one print job in a spool file.

6. An information processing method according to claim 4, wherein the first layout information, the second layout information and the new layout information each indicates the number of pages arranged on one print sheet.

7. Computer-executable process steps stored on a computer-readable memory medium, and executable by a computer to generate print data to be transmitted to a printing apparatus, wherein said process steps comprise:
    code for executing a setting step to set first and second print setting information for first and second print data, respectively, to be transmitted to the printing apparatus, the first and second print setting information including first and second layout information, respectively;
    code for executing a composing step to form composed print data by composing the first and second print data for which the first and second print setting information, respectively, have been set by the setting step; and
    code for executing a display control unit to display, for the composed print data formed in the composing step, an image of the first print data based on the first layout information included in the first setting information and an image of the second print data based on the second layout information included in the second setting information, wherein if the setting unit sets new print setting information for the composed print data, the display control step displays an image of the composed print data with a unified layout based on new layout information included in the new print setting information.

8. The computer-executable process steps according to claim 7, further comprising code for executing a spooler step to convert drawing data issued by an application to be printed into intermediate code format data different from the print data and to temporarily spool the intermediate code format data and the print setting information as one print job in a spool file.

9. The computer-executable process steps according to claim 7, wherein the first layout information, the second layout information and the new layout information each indicates the number of pages arranged on one print sheet.

* * * * *